United States Patent [19]

Thompson et al.

[11] Patent Number: 4,595,331

[45] Date of Patent: Jun. 17, 1986

[54] AUTOMATED RAILCAR LOADER AND METHOD

[75] Inventors: Roger A. Thompson, Littleton; Davey L. McCullough, Golden; Larry M. Dugan, Boulder; Lewis R. Branch, Golden, all of Colo.

[73] Assignee: Adolph Coors Company, Golden, Colo.

[21] Appl. No.: 566,891

[22] Filed: Dec. 29, 1983

[51] Int. Cl.$^4$ .............................................. B65G 67/20
[52] U.S. Cl. ..................... 414/347; 180/168; 414/631; 414/633; 414/661; 414/663; 414/672; 414/674; 414/786; 414/902
[58] Field of Search .................. 414/84, 902, 273, 274, 414/275, 280, 347, 348, 390–392, 395, 399, 629, 631, 633, 661, 786, 674; 180/168, 169, 167

[56] References Cited

U.S. PATENT DOCUMENTS

| | | | |
|---|---|---|---|
| 3,313,436 | 4/1967 | Mathew et al. | 414/629 |
| 3,788,500 | 1/1974 | Lemelson | 414/348 X |
| 4,162,869 | 7/1979 | Hitomi et al. | 180/168 X |
| 4,297,070 | 10/1981 | Diotel | 414/661 X |
| 4,328,545 | 5/1982 | Halsall et al. | 180/167 X |

Primary Examiner—Robert G. Sheridan
Attorney, Agent, or Firm—Klaas & Law

[57] ABSTRACT

Disclosed is a system for automatically loading a transport vehicle with unit loads by automatically moving the unit loads from a predetermined loading position to prescribed positions in the transport vehicle. The present invention uses a loading vehicle which receives loads from a staging device which positions the unit loads in the predetermined loading position. A unit load transfer device transfers the unit loads from the staging device to the loading vehicle. The loading vehicle uses on-board sensors in combination with placement information provided by a staging processor to perform translational and operational movements which are processed by an on-board loading vehicle processor. Unit loads can be deposited throughout the transport vehicle by maintaining a guidance path which is internally generated within the transport vehicle and can be either internally or externally generated outside the transport vehicle.

49 Claims, 17 Drawing Figures

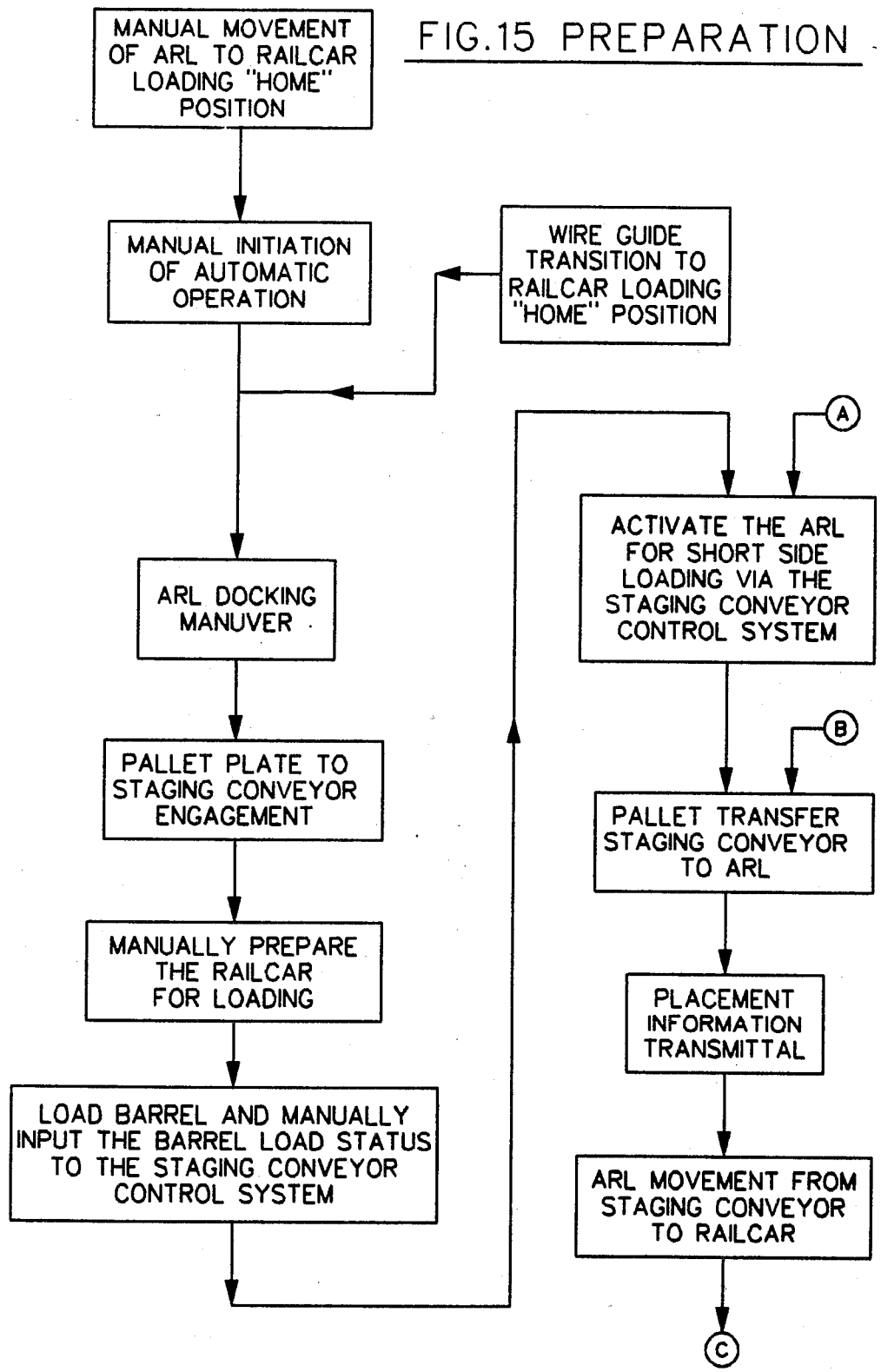
FIG.15 PREPARATION

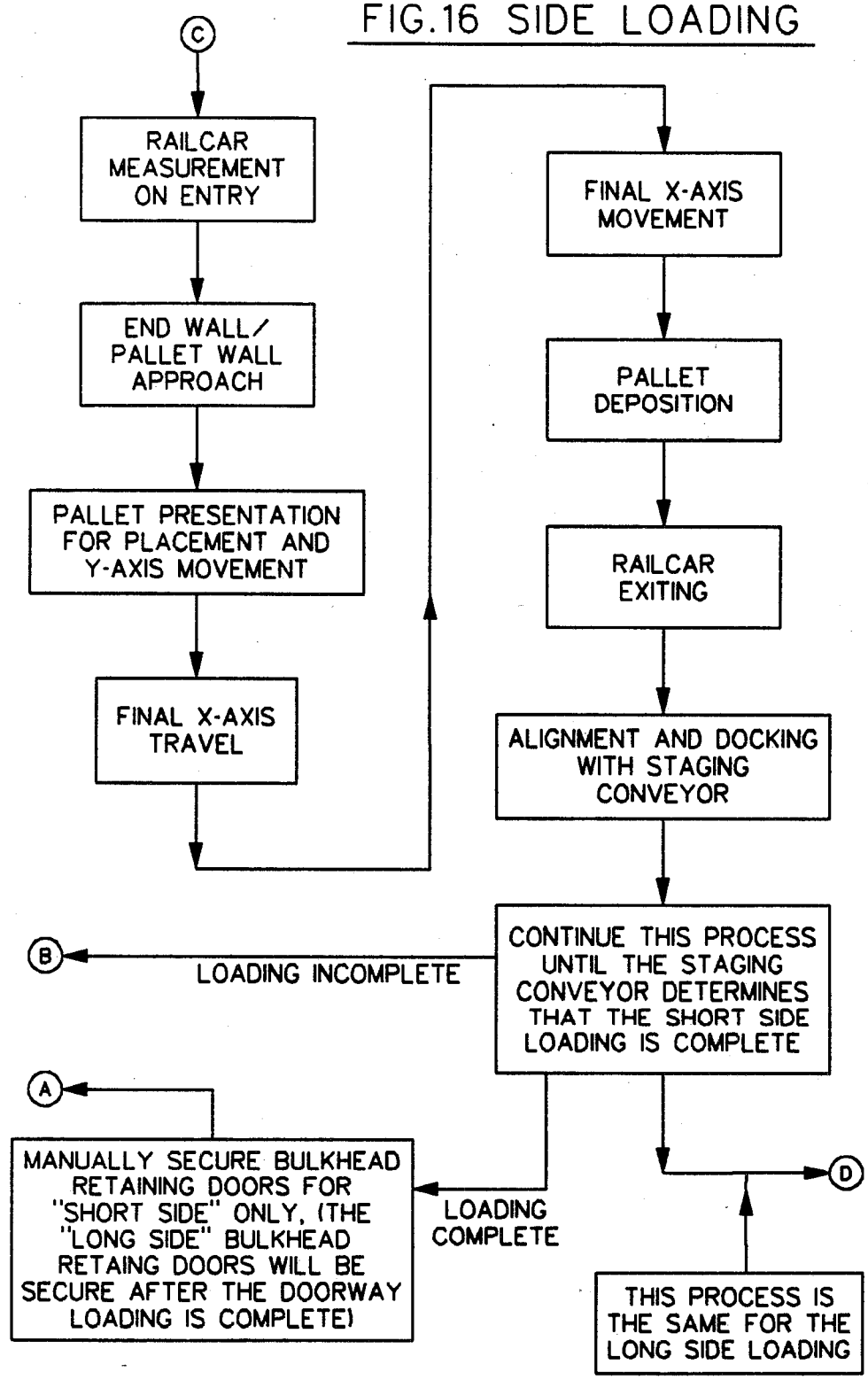
FIG.16 SIDE LOADING

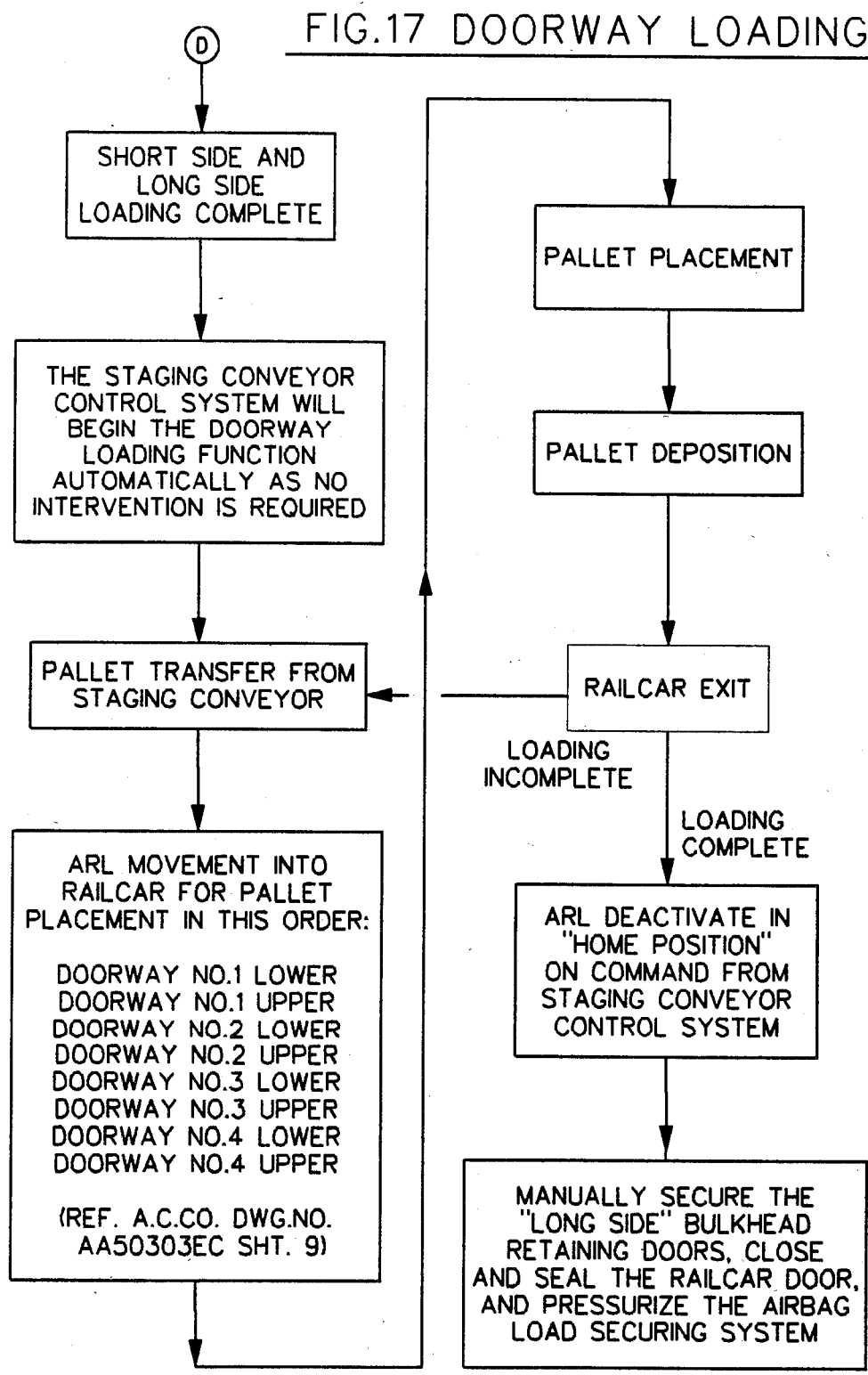

AUTOMATED RAILCAR LOADER AND METHOD

BACKGROUND OF THE INVENTION

The present invention pertains generally to robotics and more particularly to automatic guided vehicle (AGV) systems for loading railcars.

Automatic guided vehicle systems are currently in the third generation of electronic control processing circuitry and in the second generation of mechanical drive componentry. AGV systems have been used in a wide range of applications including mail delivery, warehouse stacking, movement of materials from warehouses to production lines, movement between machining centers and production lines, electronics manufacturing to supply assembly stations and clean rooms, etc. AGV's are currently being produced in configurations as tuggers or towed vehicles, pallet movers, load transports, e.g. flat bed or specialty bed transports, picking and stacking vehicles, and high-lift front loading and side loading vehicles.

Guidance of AGV's can be accomplished in various ways. The most common manner of guiding an AGV is with a wire guide path. Typically, the wire is placed in the floor along a predetermined path which the AGV is designed to follow. An RF signal is applied to the wire which is detected by a directional antenna on the AGV. Control circuitry produces control signals to guide the AGV along the wire guide path in response to the RF signals detected by the directional antenna on the AGV. This is an extremely safe way of controlling the AGV and is considered by AGV experts as a means of controlling the AGV as positive as if the vehicle were running in a channel formed in the floor. If the AGV leaves the wire guide path, the vehicle stops.

Communications can also be provided between the AGV and a central processor by modulating the RF signal applied to the wire guide path. In this manner, operational control, i.e., movement of part of the AGV such as fork lifts, unloaders, etc., and translational control, i.e., movement of the vehicle itself, can be upgraded at any point along the wire guide path since a continuous communications link has been established.

In other types of guidance systems such as optical, computer vision, sonar or radio frequency communications, a common problem exists with dead spots, interference and misreads. Simple optical guide paths use optical markers which are normally placed on the floor. The AGV contains an optical sensor which detects the delineation between the optical marker and the reflectance of the floor. The optical marker can be a visible marker such as a white line or a chemical material which invisible under ordinary light, but glows brightly when exposed to ultraviolet light. The chemical material can be applied to carpets or floors and fits well into an office environment to provide a system for automatically delivering mail.

Many times it is desirable to go off the guide path at least a few feet to perform operations such as picking up and dropping off inventory. Current systems have very little flexibility once they leave the guide path. Typical systems which are capable of leaving the guide path use dead reckoning to reach a desired location. Guidance by dead reckoning can be used to move the vehicle from one guide path to another, or locating a point in space to perform a desired operation. For example, a controller may be programmed to travel a predetermined number of wheel revolutions in a particular direction, initiate a turn, and travel another number of predetermined wheel revolutions in a new direction and perform an operational movement such as depositing a unit load. By reversing the instructions, the controller returns the AGV to its starting point. The AGV is instructed to seek the original guide path during the reverse maneuvers.

Certain problems exist with regard to such a dead reckoning guidance system. For example, the vehicle can encounter a slippery spot on the floor causing the AGV to fail to advance to the desired position for the predetermined number of wheel revolutions which have been programmed into the machine. To overcome this problem, floating measuring wheel systems have been used which substantially eliminate the problem of wheels slipping. However, the basic problem with any dead reckoning system is the accuracy of the system in being able to precisely position itself in a predetermined location with sufficient accuracy to perform a desired function. But this is particularly difficult when the AGV must travel away from the guide path for long distances and/or initiate turns. Very slight inaccuracies in turning the AGV can result in large inaccuracies in final position. Consequently, such dead reckoning systems are not suitable where precise positioning of the AGV is required.

Many applications simply cannot employ any type of external guide path such as wire guide paths or optical guide paths. For example, railcar loading systems cannot employ external guide paths since different rail cars are used for almost each loading process and the cost would not justify the savings of such an automated system. Moreover, railcar loading is performed through a side opening in the railcar which requires the automated vehicle to initiate a turn once it has entered the side opening in the rail car. After the turn is completed, the vehicle must proceed along the length of the car and deposit a unit load, such as a pallet of beer, within fractions of an inch of accuracy. With currently existing off guide path guidance systems, such as dead reckoning systems, this is virtually impossible. Not only must the AGV be capable of depositing the unit load within fractions of an inch, the turn must be initiated in a space where there is very little clearance, which further increases the requisite accuracy necessary to perform the automated operations.

Consequently, the ability to perform automated operations in areas where guide paths are not appropriate for installation, it has been virtually impossible to perform such operations with the accuracy required for many applications, such as railcar loading.

SUMMARY OF THE INVENTION

The present invention overcomes the disadvantages and limitations of the prior art by providing a system for automatically loading a transport vehicle with unit loads by automatically moving the unit loads from a predetermined loading position to prescribed positions in the transport vehicle by using both an external guide path in combination with an internally generated guide path, or, a guide path which is totally internally generated by the loading vehicle. The internally generated guide path uses a programmable processor located on the loading vehicle which receives sensor signals from loading vehicle sensors indicating the distance of various portions of the loading vehicle from objects. The information is stored in the loading vehicle processor pertaining to necessary clearances required to guide the vehicle and placement of the unit loads in predetermined locations. The internally generated course is produced from the information provided by the sensors and information stored in the programmable processor. In this manner, both translational movement, i.e., movement of the loading vehicle from one location to another, and operational movement, i.e., movement of portions of the loading vehicle, can be internally generated and controlled by the loading vehicle processor. Control in this manner, can be used either alone or in conjunction with an external guide path to provide even greater flexibility and control over movement of the loading vehicle.

The present invention may therefore comprise a system for automatically loading a transport vehicle with unit loads by automatically moving the unit loads from a predetermined loading position to prescribed positions in the transport vehicle comprising staging means for precisely positioning the unit loads in the predetermined loading position; loading vehicle means for receiving the unit loads from the predetermined loading position and placing the unit loads in the prescribed positions in the transport vehicle; stage processor means for producing placement signals indicative of placement of the unit loads in the prescribed positions in the transport vehicle; communication means for transmitting the placement signals from the stage processor means to the loading vehicle means; sensor means for producing translational and operational sensor signals to indicate translational and operational movements of the loading vehicle; loading vehicle processor means for producing steering control signals to guide the loading vehicle means along a predetermined path internally generated by the loading vehicle processor means in response to the translational sensor signals and the placement signals, and for producing operational movement signals in response to the operational sensor signals and the placement signals to receive the unit loads from the staging means and placing the unit loads in the prescribed positions.

The present invention may also comprise a method of automatically loading a transport vehicle with unit loads by automatically moving the unit loads with a loading vehicle from a predetermined loading position on a staging device to prescribed positions in the transport vehicle comprising the steps of positioning the unit loads in the predetermined loading position on the staging device; transferring the unit loads from the staging device to the loading vehicle; generating placement signals from a staging processor indicative of placement of the unit loads in the prescribed positions; communicating the placement signals from the staging processor to a loading vehicle processor disposed on the loading vehicle; generating translational sensor signals indicative of translational movements of the loading vehicle means; generating operational sensor signals indicative of operational movements of a unit load carrying device; generating translational control signals in the loading vehicle processor in response to the placement signals and the translational sensor signals to guide the loading vehicle along a predetermined path in the transport vehicle and between the staging means and the transport vehicle; generating operational control signals in the loading vehicle processor in response to the placement signals and the operational sensor signals to control operational movements of the unit load carrying device to receive the unit loads from the predetermined loading position and place the unit loads in the prescribed positions.

The advantages of the present invention are that it is capable of placing unit loads in predetermined positions with a high degree of accuracy without the need for an external guide path. In this manner, control of the movements of the loading vehicle are more flexible than movement along an external guide path since movement can be controlled by simply reprogramming the processor rather than physically changing the external guide path. This allows automatic guided vehicles to be used in applications where external guide paths cannot be implemented, such as in railcar loading where a high degree of accuracy is required in the loading system.

OBJECTS OF THE INVENTION

It is therefore an object of the invention to provide an improved automatic guided vehicle.

Another object of the present invention is to provide a guidance system for an automatic guided vehicle.

Another object of the present invention is to provide a system for automatically loading a transport vehicle such as railcars, trucks, etc.

Another object of the present invention is to provide a system for automatically loading a transport vehicle with unit loads by automatically moving the unit loads from a predetermined loading position to prescribed position on the transport vehicle.

Another object of the present invention is to provide a system for automatically loading a transport vehicle with unit loads by automatically moving said unit loads along an externally defined course in combination with an internally generated course from a predetermined loading position to prescribed positions in the transport vehicle.

Another object of the present invention is to provide a method for automatically loading a transport vehicle with unit loads by automatically moving said unit loads with a loading vehicle from a predetermined loading position on a staging device to prescribed positions in the transport vehicle.

Additional objects, advantages and novel features of the invention are set forth in part in a description which follows and will be understood by those skilled in the art upon examination of the following or may be learned by practice of the invention. The objects and advantages of the invention may be realized and obtained by means of the instrumentalities and combinations particularly pointed out in the appended claims.

BRIEF DESCRIPTION OF THE DRAWINGS

An illustrative and presently preferred embodiment of the invention is shown in the accompanying drawings wherein:

FIGS. 15, 16 and 17 comprise a flow diagram of the functions performed in accordance with the present invention.

Detailed Description of the Present Invention

Figure 1:
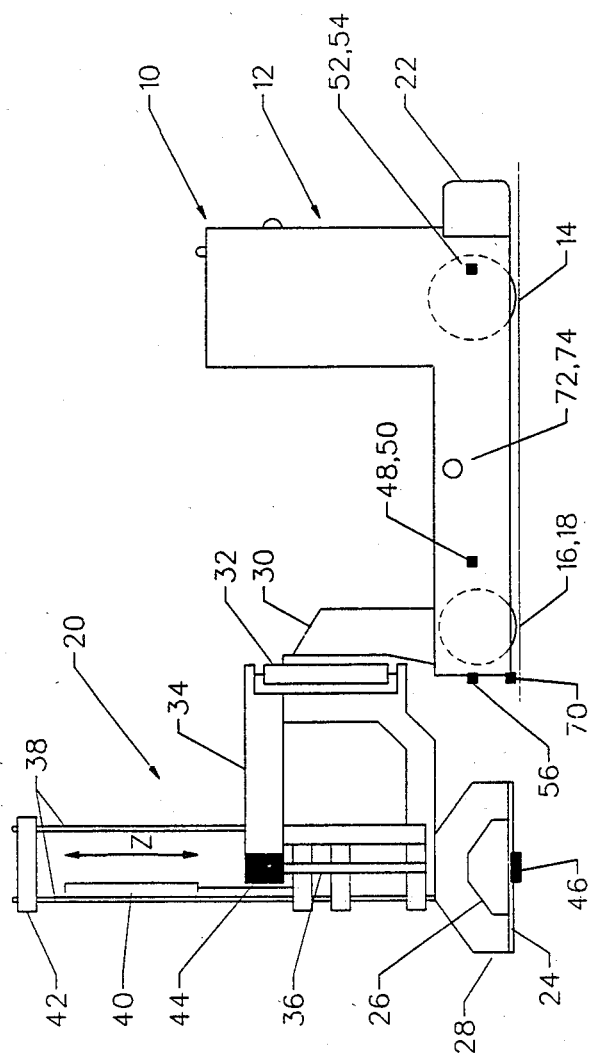
FIG. 1 is a schematic side view of the loading vehicle used in accordance with the present invention.

FIG. 1 discloses the loading vehicle 10 having a body portion 12 which is supported by front wheel 14 and rear wheels 16, 18. Front wheel 14 comprises a guidance wheel for guiding the loading vehicle 10. Guidance wheel 14 swivels about a vertical axis to initiate turns of up to 90°. Rear wheels 16, 18 support the rear portion of the loading vehicle 10. Plate handling means 20 controls the position of plate means 24 to allow movement of the unit loads in longitudinal, transverse, rotational and vertical directions. Bumper 22 is coupled to body portion 12 of loading vehicle 10 and functions to interrupt operation of loading vehicle 10 whenever an object is encountered. Plate means 24 is supported by plate support means 28. Unit load removal means 26 is disposed to push unit loads from plate means 24. Vertical support 30 moves in the y-direction on transverse connector means 32. Transverse connector means 32 moves in the x-direction on body portion 12. This provides both x-direction and y-direction movement of the plate means 24. Rotational connector means 36 allows rotational movement of plate means 24 relative to loading vehicle 10.

Figure 2:
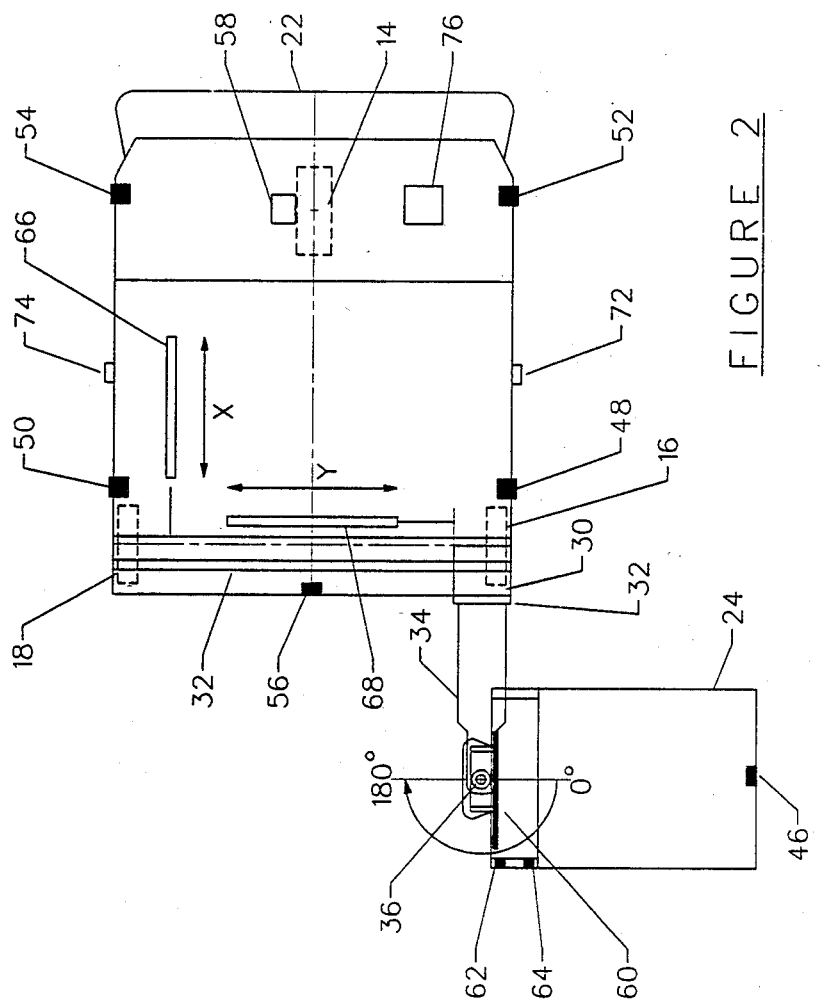
FIG. 2 is a schematic plan view of the loading vehicle illustrated in FIG. 1.

As illustrated in FIG. 2, a total of 180° of rotation is provided by rotational connector means 36. In a similar manner, vertical connector means 38 (FIG. 1) controls movement of plate support means 28 (FIG. 1) and plate means 24 in a vertical direction. Vertical absolute position sensor means 40 (FIG. 1) senses the absolute vertical position of plate means 24 and produces a vertical absolute sensor signal. Connector bracket 42 connects vertical connector means 38. Rotational sensor means 44 is connected to rotational connector means 36 to sense the rotational position of plate means 24. Plate sensor means 46 provides a plate sensor signal which indicates the displacement of the end of the plate means from obstructions. Front side sensors 48, 50 and rear side sensors 52, 54 produce loading vehicle transverse position signals indicating displacement of the loading vehicle from side objects, i.e., obstructions displaced to the side of (transversely from) the loading vehicle. Front vehicle sensor means 56 produces a loading vehicle longitudinal position signal indicating the longitudinal displacement of objects from the loading vehicle. Measurement encoder means 58 is coupled to guidance wheel 14 and produces a distance measurement signal indicating the distance traversed by the loading vehicle. Pressure sensor means 60 is disposed from an exterior portion of unit load removal means 26 such that it contacts the unit load and provides a pressure signal indicative of the pressure generated between the unit load and the unit load removal means. Unit load removal sensor means 62, 64 provide a unit load removal sensor signal which indicates the position of unit load removal means 26 to indicate when a unit load has been removed from plate means 24. Longitudinal absolute position sensor means 66 produces a longitudinal absolute position sensor signal indicating the longitudinal position of transverse connector means 32. Transverse absolute position sensor means 68 produces a transverse absolute position sensor signal which indicates the transverse position of horizontal support 34, and consequently, plate means 24. External course sensor means 70 produces an external course sensor signal to follow a external path, such as a guide wire path, placed in the floor. Communication means 72, 74 provides a communication link between the loading vehicle 10 and the staging means. Loading vehicle processor means 76 is disposed on the loading vehicle 10 and comprises the artificial intelligence to control both translational and operational movements of the loading vehicle. Loading vehicle processor means 76 can function to produce steering control signals in response to an internally generated course or an externally generated course. Alternatively, an additional loading vehicle processor can be used to perform either function separately. The loading vehicle processor means comprises a standard microcomputer processor having sufficient storage capability to perform the functions necessary to automatically load transport vehicle 112.

FIG. 2 also illustrates the x-axis and y-axis locations relative to loading vehicle 10. The x-axis is disposed along the longitudinal direction of loading vehicle 10 while the y-axis is disposed along the transverse direction of loading vehicle 10.

Figure 3:
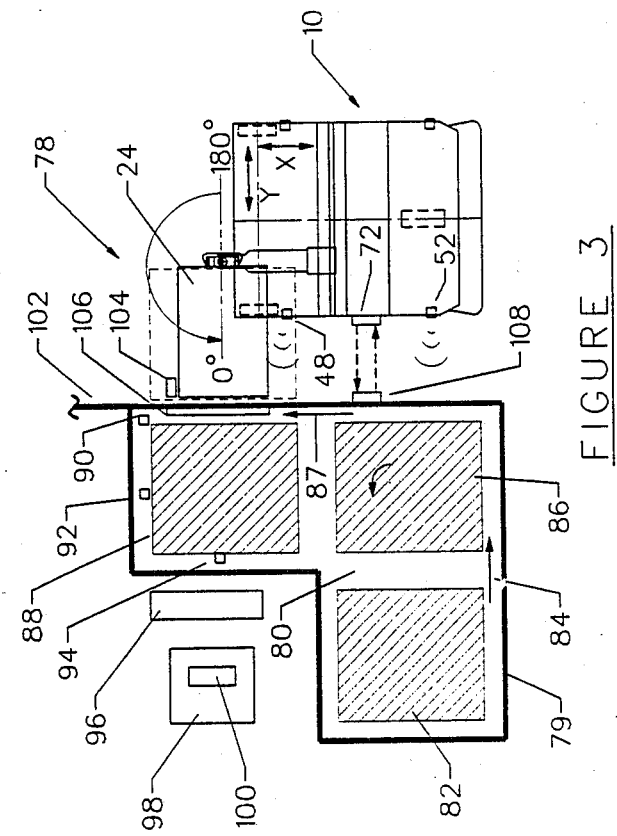
FIG. 3 is a schematic plan view of the loading vehicle positioned adjacent the staging area.

FIG. 3 is a schematic top view of the loading vehicle 10 positioned for accepting unit loads from staging means 78. Staging means 78 comprises a staging platform 79 having a movement device 80 for moving the unit loads to various positions. Unit loads are initially loaded onto the staging platform 79 and placed in initial position 82. Movement device 80 moves the unit loads from initial position 82 to secondary position 86 as illustrated by indicator 84. Unit loads are then moved from secondary position 86 to predetermined loading position 88 as illustrated by indicator 87. Staging means 78 also provides for pallet rotation, pallet squaring and pallet verification. The unit load is precisely positioned in the predetermined loading position in response to sensor signals produced by x-axis unit load position sensor 92 and y-axis unit load position sensor 94. These sensors are mounted on staging platform 79 in a stationary position to ensure precise positioning of the unit load in the predetermined loading position. Unit load transfer means 96 functions to transfer the unit load from the predetermined loading position 88 onto plate means 24 such that it is precisely positioned on plate means 24. Unit load transfer means comprises a device for uniformly pushing the unit load from the predetermined loading position 88. Unit load clear sensor 90 indicates when the unit load has been completely transferred from staging means 78 to plate means 24. Staging means console 98 comprises a console for controlling staging means 78 and communicating information to loading vehicle 10. This is accomplished through staging processor means 100. Staging means 78 has a side reference plate means 102 which is detected by side sensors 48 and 52 to locate the loading vehicle 10 a predetermined distance from side reference plate means 102. X-axis staging sensor 104 is attached to the floor adjacent staging means 78 and provides a sensor signal for precisely positioning plate means 24 in the x-axis with reference to staging means 78. Y-axis staging sensor 106 is mounted adjacent side reference plate means 102 to provide a y-axis positioning signal to precisely locate plate means 24 in the y-direction. Staging communication means 108 is positioned to communicate with loading vehicle communication means 72 when loading vehicle 10 is positioned in the correct location for transfer of unit loads from the staging means. The communication link established by staging communication means 108 and loading vehicle communication means 72 permits transfer of information, such as placement signals, which are necessary to properly load the transfer vehicle.

Figure 4:
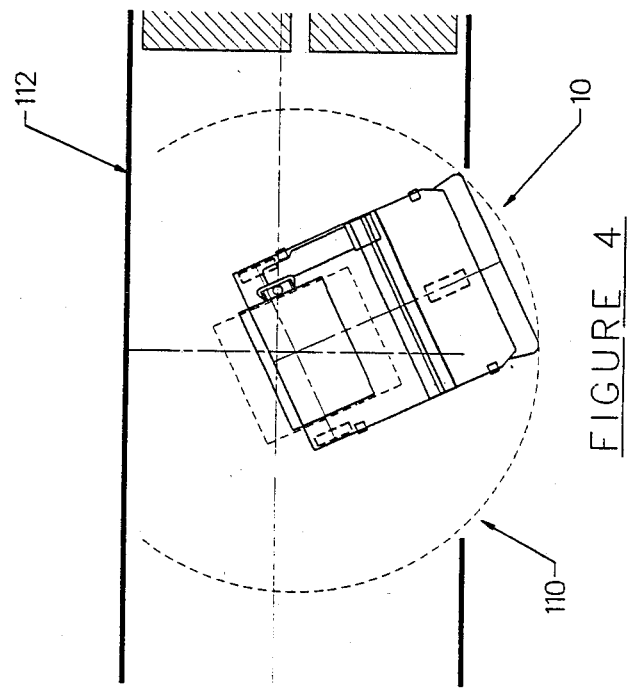
FIG. 4 is a schematic plan view of the loading vehicle initiating a turn in a railcar.

FIG. 4 illustrates the manner in which a turn is initiated by loading vehicle 10 after it has entered a side opening 110 in transport vehicle 112, which may comprise a railcar.

Figure 5:
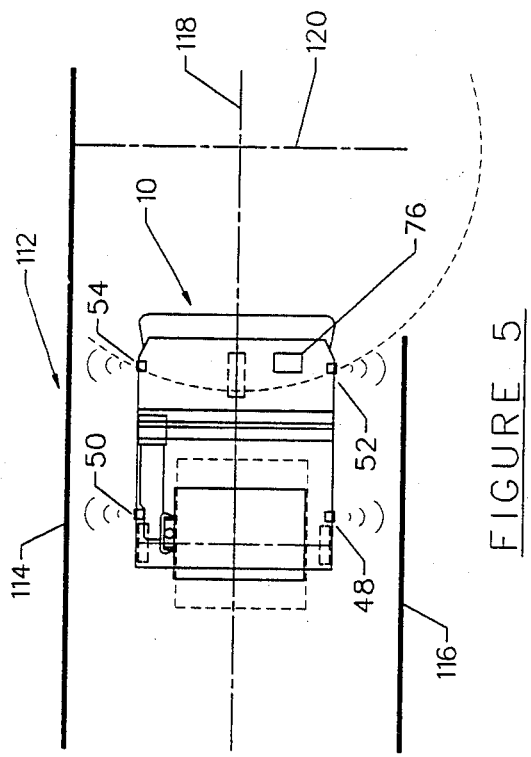
FIG. 5 is a schematic plan view of the loading vehicle traversing the center portion of a railcar.

FIG. 5 illustrates the manner in which a loading vehicle 10 traverses the length of the transport vehicle 112 using side sensors 48, 50, 52, 54 to provide side sensor signals which indicate the distance of loading vehicle 10 from sidewalls 114, 116. In this manner, the loading vehicle processor means 76 can produce control signals to guide loading vehicle 10 along a center line 118 in railcar 112.

Figure 6:
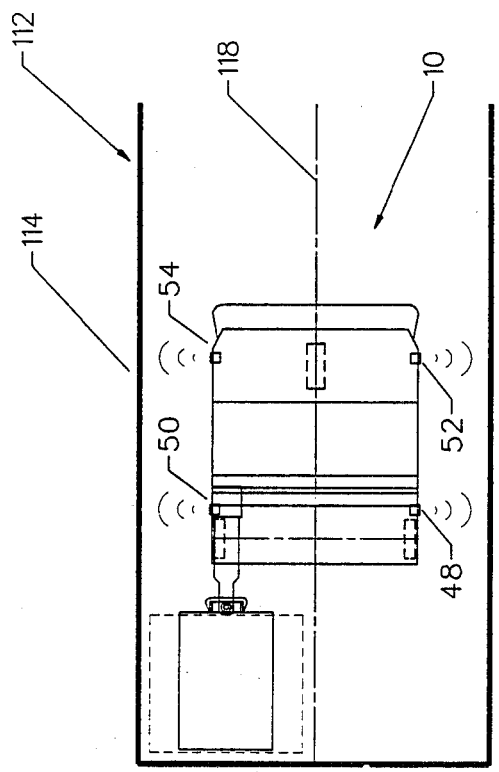
FIG. 6 is a schematic plan view of the loading vehicle placing a unit load within the railcar.

FIG. 6 illustrates the manner in which a unit load is placed in a prescribed position in transport vehicle 112 while maintaining loading vehicle 10 positioned on center line 118. In this manner, loading vehicle 10 can perform all the necessary operations to load the transport vehicle 112 from a single internally generated guidance path 118.

Figure 7:
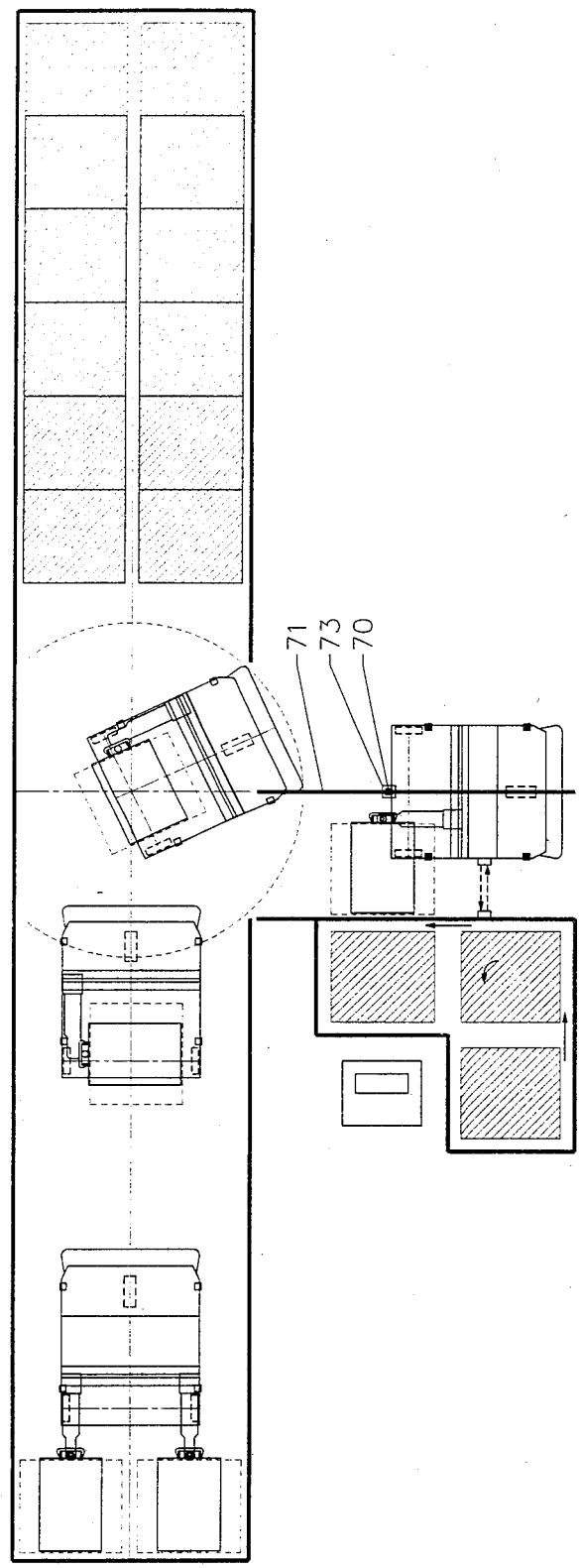
FIG. 7 is a schematic plan view of the railcar and staging area illustrating the loading vehicle adjacent the staging area, initiating a turn, traversing the railcar and depositing the unit loads at one end of the railcar.

In operation, the loading vehicle 10 is initially placed adjacent staging means 78 by manually moving loading vehicle means 10 into the approximate home position, as illustrated in FIG. 3. Once the loading vehicle 10 is docked in the proper position, it will deactivate awaiting further instructions from staging processor means 100. The movement into the approximate home position, as illustrated in FIG. 3, can be accomplished manually as disclosed above, or can be accomplished through an external guidance path such as a guide wire path having an indicator to precisely position the loading vehicle 10, as illustrated in FIG. 7. Such a guide wire path could guide the loading vehicle 10 between the loading position adjacent the staging means to the railcar and additionally provide guidance to other locations in the warehouse for other purposes.

If an external guidance path is not used, the side sensors will determine on which side of the vehicle 10 the staging conveyor 78 is located by detecting side reference plate means 102. Once the vehicle is manually placed or detects it is next to the staging conveyor, the vehicle will determine the location of the staging conveyor, i.e. the side of the vehicle on which the staging conveyor is located. This information is stored in loading vehicle processor means 76 for later use when the loading vehicle 10 exits transport vehicle 112. The particular set of side sensors, such as left side sensors 48, 52, or right side sensors 50, 54, will be stored in the loading vehicle processor means 76 for later use when the loading vehicle 10 must locate the staging conveyor after exiting of transport vehicle 112. The elevation of the plate means 24 is then adjusted to the known and fixed position of the staging platform 79 to facilitate smooth transfer of unit loads from staging means 78 to plate means 24. Loading vehicle 10 then positions itself in the appropriate location by moving away from the railcar along the x-axis in an attempt to establish a communications link between staging communication means 108 and left side communication means 72. If a communications link is not established before the end of the side reference plate means as detected by side sensor 52, loading vehicle 10 will move in a forward direction towards the transport vehicle along the x-axis a predetermined distance as measured by measurement encoder means 58. If the loading vehicle 10 cannot establish a communications link during forward travel, loading vehicle 10 will be deactivated pending human intervention. Once a communication link is established between staging means 78 and loading vehicle 10, loading vehicle 10 will stop so that plate means 24 can be moved into the loading position for transfer of the unit loads from predetermined loading position 88. The physical location and acceptance angle of the communication channel established between communication devices 108 and 72 assure that loading vehicle 10 is positioned with sufficient tolerance to allow plate handling means 20 to position plate means 24 in the precise location required to place the unit load on plate means 24 with sufficient accuracy to insure placement within the transport vehicle.

Plate handling means 20 functions to position plate means 24 in the precise location required to transfer unit loads to plate means 24. This is accomplished by moving plate means 24 in the y-axis until it engages y-axis staging sensor 100 which produces a signal which is communicated to loading vehicle means 10 via the communication link established between communication means 108, 72. In a similar manner, plate handling means 20 advances plate means 24 in the x-axis until it engages x-axis staging sensor 104. In this manner, plate means 24 is precisely located to receive unit loads from predetermined loading position 88.

Transport vehicle 112 is then prepared for loading. For example, in loading railcars with pallets of beer, kegs are loaded first at each of the ends of the railcar. The quantity of kegs which have been manually loaded into the railcar are entered in the staging processor means 100 such that positions of the pallets of beer can be generated by staging processor means 100.

To activate loading of the transport vehicle, entry is made in staging processor means 100 at staging console means 98 to activate loading of the first side of the transport vehicle 112. Staging processor means 100 reconfirms that plate means 24 is positioned in the proper location in response to signals from x-axis staging sensor 104 and y-axis staging sensor 106 and confirm the docking status of the loading vehicle 10 via the communications link. After these items have been confirmed, staging means 78 begins the unit load transfer process.

The unit load transfer process is initiated by staging processor means 100 by generating a unit load transfer signal to activate unit load transfer means 96 to push the unit load from predetermined loading position 88 onto plate means 24. Unit load clear sensor 90 produces a unit load clear signal when the unit load has been transferred from staging means 78. Additionally, pressure sensor means 60 produces a pressure signal when the unit load is in the fully loaded position on plate means 24. As soon as the pressure signal is received by staging processor 100 from loading vehicle means 10 via the communication channel means 72, 108, a control signal is produced to retract unit load transfer means 96. Again, unit load clear sensor 90 is checked to confirm that the unit load has been transferred from staging means 78. After the unit load transfer process is complete, loading vehicle 10 retracts the plate means 24 into the carrying position, as illustrated in FIG. 4, and awaits instructions from staging processor means 100 as to placement of the unit load in a prescribed position in transport vehicle 112.

Staging processor means 100 determines the placement location for each unit load which is placed in transport vehicle 112. Placement information is communicated to loading vehicle 10 via the communications link prior to departure of loading vehicle 10 from the loading position adjacent staging means 78. Placement information consists of the side of the transport vehicle to be loaded, distance from the end of the transport vehicle end wall, outboard or inboard unit load position, and upper or lower unit position. After this information is received, loading vehicle 10 moves in a forward direction towards the transport vehicle side opening 110. Again, guidance between staging means 78 and the transport vehicle can be accomplished through either an external guide path such as a wire guide path, or an internally generated guide path.

Side sensors 48, 50, 52, 54 produce loading vehicle transverse position signals which are used to produce a totally internally generated guide path to control movement of the loading vehicle 10 from staging means 78 to transport vehicle 112, in accordance with one embodiment of the invention. The loading vehicle processor means produces translational control signals including steering control signals to maintain the required distance from side reference plate means 102 to assure that loading vehicle 10 will track along the door opening center line 120. Staging means 78 is physically located so that the distance from side reference plate means 102 to door opening center line 120 allows the loading vehicle 10 to be positioned on door opening center line 120 while in the loading position adjacent staging means 78, as illustrated in FIG. 3.

When loading vehicle 10 reaches the doorway opening 110, front vehicle sensor means 56 monitors the distance to outside wall 114 of transport vehicle 112, while simultaneously monitoring the distance traveled from staging means 78 in response to a distance measurement signal produced by measurement encoder means 58. Since transport vehicles, such as railcars, have varying widths and lengths, it is necessary to determine the proper position of loading vehicle 10 to initiate a turn in the transport vehicle 112. Minimum clearance values are stored within loading vehicle processor means 76 to ensure proper clearance to complete a turn. Transport vehicle center line 118 is determined from loading vehicle transverse position signals produced by side sensors 50, 52, 54, 56 during the first entry into transport vehicle 112. Loading vehicle longitudinal position signals produced by front vehicle sensor means 56 during subsequent entries into transport vehicle 112 provide sufficient information to loading vehicle processor means 76 to substantially align loading vehicle 10 on transport vehicle center line 118. The loading vehicle longitudinal position signals produced by front vehicle sensor means 56 also function as obstacle detection signals during translational movements of loading vehicle 10.

The manner in which the entry distance of loading vehicle 10 and the position of transport vehicle center line 118 is determined is set forth in more detail below. Loading vehicle 10 is moved a predetermined distance from staging means 78 through transport vehicle opening 110 into transport vehicle 112 during the first entry only. Loading vehicle 10 is then stopped, turned 90°, as illustrated in FIG. 4, proceeds slowly down the railcar measuring the distance to transport vehicle walls 114, 116, as illustrated in FIG. 5. The difference in the distances measured is halved and combined with the predetermined distance first used to enter transport vehicle 112 to locate the approximate position of transport vehicle center line 118. If the distance from sidewall 116 is less than the distance from sidewall 114, then half of the difference of the measured distances is added to the predetermined entry distance. If the distance measured from the sidewall 116 is greater than the distance measured to sidewall 114, then half of the difference in the measured distance is subtracted from the predetermined entry distance. The new entry value distance is used in future entries of the loading vehicle 10 in transport vehicle 112. This process is performed during each entry of the loading vehicle so that the entry distance is monitored and updated as the loading cycle progresses. If the entry distance varies more than a predetermined amount or exceeds the stored minimum distances for clearance of loading vehicle 10 in opening 110, loading vehicle 10 is halted and disabled. Additionally, loading vehicle transverse position signals produced by side sensors 50, 52, 54, and 56 continuously monitor the distance to sidewalls 114, 116 to maintain travel of loading vehicle 10 along center line 118.

As disclosed above, staging processor means 100 provides placement information as to placement of unit loads in prescribed locations in transport vehicle 112. Placement information is communicated to loading vehicle 10 and stored in loading vehicle processor means 76. The placement information is used to control translational movement of loading vehicle 10 in transport vehicle 112 to determine the proper distance of travel after the 90° turn is completed. The loading vehicle processor means computes the translational distance to be traveled by loading vehicle 10 from the unit load placement information. Loading vehicle processor means 76 controls the translational movement of loading vehicle 10 to initiate operational movements of plate means 24 to allow enough space to maneuver the unit load from the turning position to the presentation position, as illustrated in FIG. 6.

The unit load placement information supplied by staging processor means 100 is used by loading vehicle processor means to produce operational control signals to control operational movement of plate handling means 20. These operational control signals comprise unit load carrying device control signals to move the unit load to the appropriate height and appropriate inboard/outboard pallet position for unloading. The height location will be a fixed value for the lower unit load position and another fixed value for the upper unit load position. Vertical absolute position sensor means produces a vertical absolute position sensor signal to indicate when plate means 24 has reached the fixed values for the upper and lower unit load positions. Similarly, rotation of plate means 24 to the position for unloading, as illustrated in FIG. 6, is monitored by rotational sensor means 44 which produces a rotational sensor signal indicating the rotational position of plate means 24. Loading vehicle 10 is then moved to an appropriate translational distance on transport vehicle center line 118 such that plate handling means 20 is capable of placing the unit load in the prescribed position. Horizontal support 34 is then moved along the y-axis to place the unit load the correct distance from the transport vehicle sidewall 114, as illustrated in FIG. 6. Side range sensors 50, 54 produce loading vehicle transverse position signals which are supplied to loading vehicle processor means 76 which produce operational control signals to move plate means 24 a transverse distance along the y-axis such that the unit load is positioned the correct distance from sidewall 114. This completes the y-axis placement of the unit load.

The loading vehicle was previously stopped in a position sufficiently far from previously loaded unit loads or the transport vehicle end wall to allow plate handling means 20 sufficient space for rotation of plate means 24 to the presentation position. Plate sensor means 46 produces a plate sensor signal indicating the displacement of plate means 24 in the x-axis from the adjacent unit load or transport vehicle end wall. Loading vehicle processor means then produces translational control signals to move transport vehicle 10 toward the unit load stack until plate means 24 is within the travel range of the x-axis movement of transverse connector means 32. After the loading vehicle 10 is stopped, operational control signals produced by the loading vehicle processor means 76 causes x-axis movement of transverse connector means 32. Processor means 76 produce the operational control signals in response to plate sensor signals produced by the plate sensor means 46 which monitor movement of the unit load in the x-axis to within approximately 2" of the unit load/railcar end wall. At this point, the unit load should be located in the x-axis and y-axis, approximately 1" above either the floor or bottom unit load and approximately 2" away from either the adjacent pallet or transport vehicle end wall in the x-axis.

Final x-axis unit load placement is accomplished by utilizing pressure signals produced by pressure sensor means 60. Plate means 24 is moved in a forward direction along the x-axis while loading vehicle processor means 76 monitors the pressure signal produced by pressure sensor 60. Movement in the forward x-axis direction continues for a predetermined distance, e.g. 4", or until a predetermined pressure limit is reached. If the predetermined distance has been reached before the pressure limit is met, loading vehicle processor means 76 deactivates all operational control signals. If the pressure limit is met, x-axis movement ceases and the loading vehicle processor means 76 initiates operational control signals to deposit the unit load.

The unit load deposition process comprises a sequence of events that moves the loading vehicle 10 away from the unit load stack in transport vehicle 112 leaving the pallet in a prescribed position in the transport vehicle 112. Loading vehicle processor means produces an operational signal comprising a unit load removal signal to activate the unit load removal means 26 such that unit load removal means 26 exerts a force to push the unit load from plate means 24. The force produced by unit load removal means is a constant, predetermined forces on the pallet, as measured by pressure sensor means 60. To maintain the unit load in the prescribed position, loading vehicle means 10 is pushed away from the unit load stack in response to the pressure generated by unit load removal means 26. When unit load removal means 26 reaches full extension, unit load removal sensor means 64 produces a removal sensor signal to verify that the unit load has been removed from plate means 24. If unit load removal means 26 is not at a full extension point, a problem exists with the unit load deposition process and the unit will be deactivated. If unit load removal sensor means produces a removal sensor signal indicating that the unit load has been fully removed from plate means 24, loading vehicle 10 prepares for transport vehicle exiting.

Transport vehicle exiting is accomplished by producing operational control signals to move plate means 24 into the carrying position. The carrying position of plate means 24 is defined as movement of plate handling means 20 in the fully forward position along the x-axis towards the front of the vehicle, full movement in the y-axis towards the left side of the vehicle, rotational movement to the 0° position and vertical axis movement so that plate means 24 is a predetermined distance from the loading vehicle bed, e.g., 2". Once plate means 24 is placed in the carrying position, loading vehicle 10 proceeds toward opening 110 in transport vehicle 112 for a predetermined distance which has been stored in the loading vehicle processor means to locate door opening center line 120. Measurement encoder means 58 produces a distance measurement signal which is capable of reasonably aligning loading vehicle 10 with door opening center line 120. As loading vehicle 10 moves towards opening 110, side sensors 48, 50, 52, 54 produce loading vehicle transverse position signals to guide loading vehicle 10 along transport vehicle center line 118. Sensors 48, 50, 52, 54 detect opening 110 in transport vehicle 112 and compare the distance traveled upon detection of opening 110 with information previously stored in loading vehicle processor means 76 to verify that opening 110 is in the proper location. Once the calculated distance has been traversed by loading vehicle 10, this distance is compared with the previously measured distance to obtain a comparison. If the comparison exceeds a predetermined value, a malfunction exists and loading vehicle 10 is deactivated pending human intervention. If the compared values are within a certain tolerance, guidance wheel 14 is turned to initiate a 90° turn to align loading vehicle 10 with door opening center line 120. The vehicle is then driven a predetermined distance to accomplish a 90° turn. Guidance wheel 14 is then straightened to prepare for exiting transport vehicle 112.

Loading vehicle processor means produces translational control signals to cause loading vehicle 10 to exit opening 110 of transport vehicle 112. Side sensors 48, 50, 52, 54 produce longitudinal vehicle transverse position signals to measure the distance to side reference plate means 102. Translational control signals are generated by loading vehicle processor means 76 which comprise steering control signals to control guidance wheel 14. Guidance wheel 14 aligns loading vehicle 10 in the docking position adjacent staging means 78, as illustrated in FIG. 3. The docking maneuver is the same as the initial docking maneuver with the exception that no manual intervention is required.

Alternatively, an external guidance path can be provided between staging means 78 and transport vehicle 112. In accordance with this embodiment of the invention, loading vehicle 10 exits transport vehicle 112 and searches for the external guidance path. Once the external guidance path is engaged, docking is performed automatically in accordance with standard external guidance path docking procedures.

The loading procedure, in accordance with both embodiments of the invention, continues until the right side has been completely loaded. At this point a manual entry is made into staging processor means 100 at staging console means 98 to initiate left side loading of transport vehicle 112. Left side loading is performed in the same manner as the right side loading.

Figure 8:
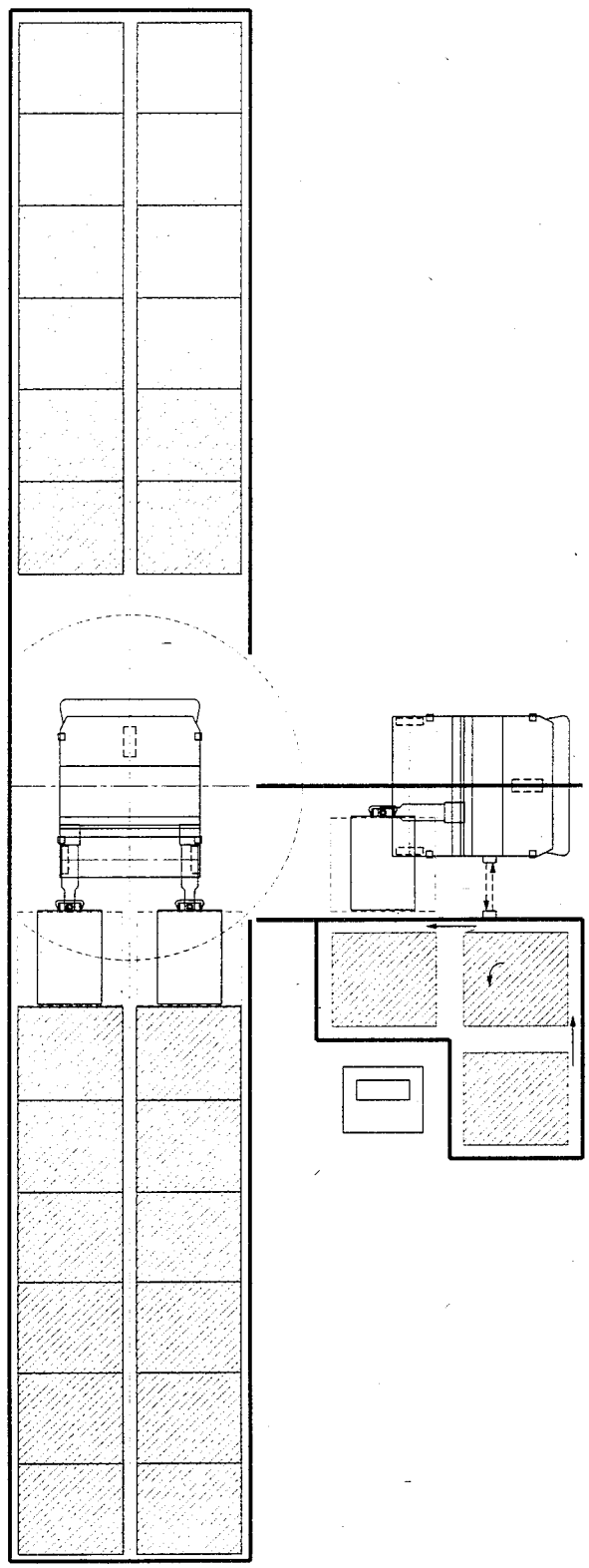
FIG. 8 is a schematic plan view of the railcar depositing the unit loads in the last side position.
Figure 9:
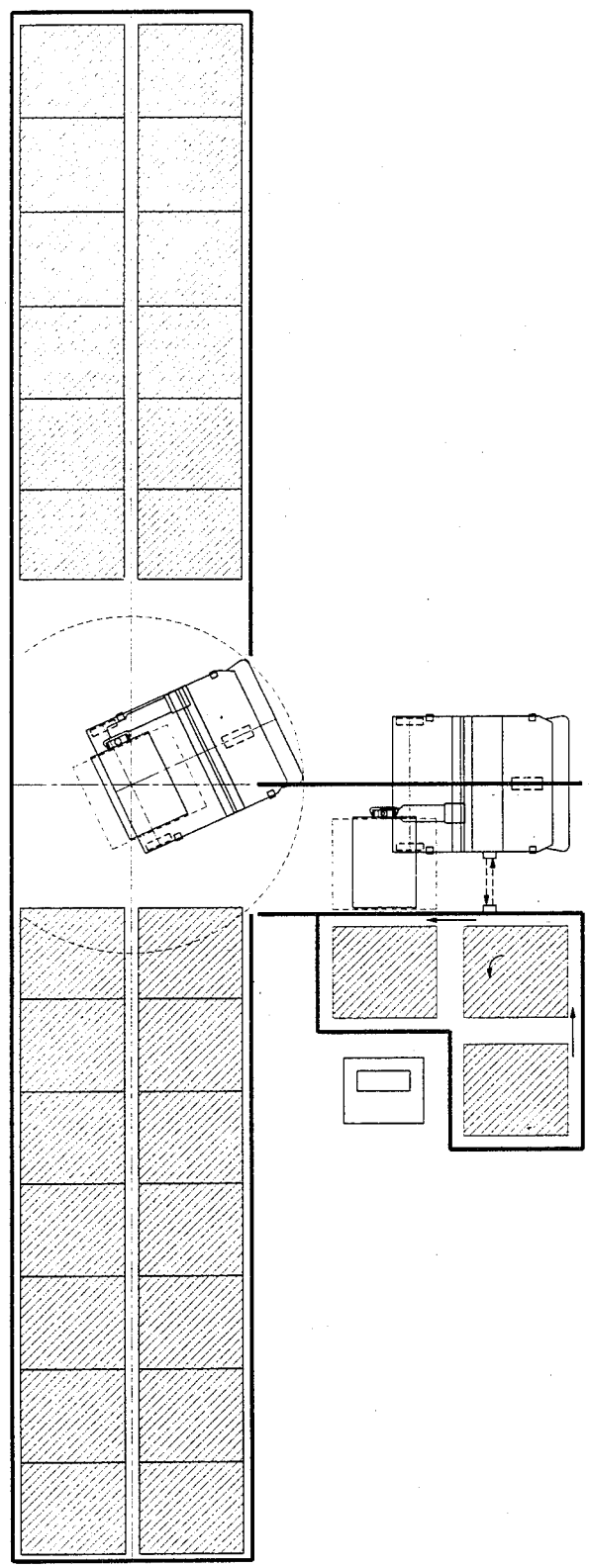
FIG. 9 is a schematic plan view of the loading vehicle initiating a turn in the railcar after depositing the last unit loads to be deposited in the sides of the railcar.

FIGS. 7 through 9 illustrate the manner is which right side and left side loading are performed.

FIGS. 10 through 14 illustrate the manner in which doorway loading is performed. Since no railcar preparation is required in doorway loading, operator intervention is not necessary to initiate the doorway loading process. Consequently, when the left side loading is complete, as illustrated in FIG. 9, staging processor means 100 produces placement signals to initiate the doorway loading function. As illustrated in FIGS. 10 through 14, eight unit loads are deposited in doorway locations. Each of these locations is indicated as doorway positions 1 through 4 having an upper or lower designation.

Figure 10:
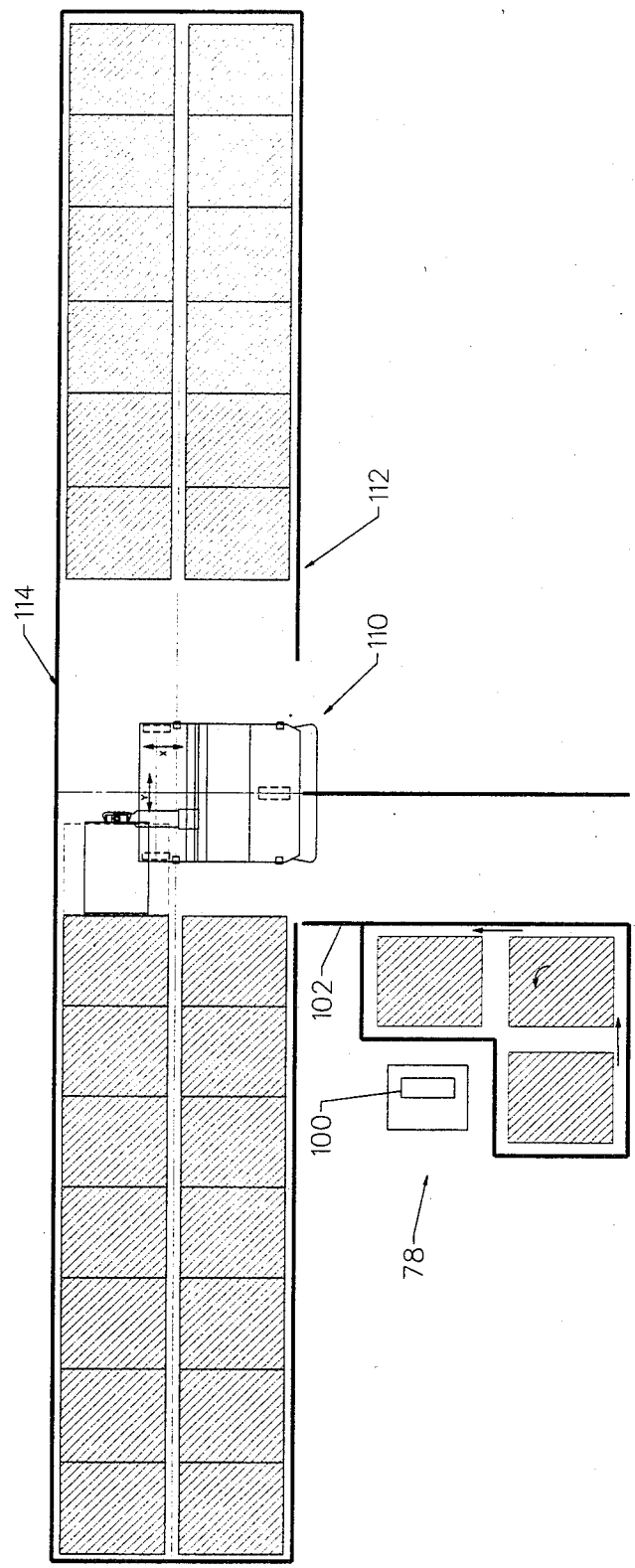
FIG. 10 illustrates the loading vehicle depositing a unit load in the #1 doorway position.

FIG. 10 illustrates deposition of unit loads in the doorway #1 lower position. Loading vehicle 10 receives a unit load from staging means 78, proceeds with the pallet towards transport vehicle opening 110 maintaining a fixed distance from side reference plate means 102 by using left side sensors 48, 52. Loading vehicle 10 travels a fixed distance forward based upon placement information provided by staging processor means 100. Front vehicle sensor means produces loading vehicle longitudinal position signals to verify the longitudinal displacement of loading vehicle 10 from transport vehicle wall 114. From this information, loading vehicle 10 is placed in an approximate position to begin pallet deposition in the doorway #1 position.

Front vehicle sensor means provides the loading vehicle longitudinal position signal which is used by loading vehicle processor means to position plate means 24 and the unit load in the x-direction. The unit load is positioned a fixed distance from transport vehicle wall 114. Longitudinal absolute position sensor means produces operational sensor signals or unit load carrying device position signals which are combined with the loading vehicle longitudinal position signals produced by rear vehicle sensor means 56 to yield the unit load location information for proper placement in the x-axis. Plate handling means 20 then moves the unit load in the y-axis until plate sensor means produces a plate sensor signal indicating that the unit load is within a predetermined distance of the pallet wall, i.e., 4" of the pallet wall. Vertical movement of plate means 24 is initiated to locate plate means 24 in the correct unit load position height. Vertical absolute position sensor means produces a vertical absolute position sensor signal to indicate the height of plate means 24. The unit load is consequently fully positioned in the x-axis and vertical axis and only needs final positioning in the y-axis.

Final y-axis pallet placement is achieved by moving plate handling means 20 in the y-axis direction while monitoring pressure sensor signals produced by pressure sensor means 60. Movement in the y-direction is programmed to continue for a predetermined distance, e.g., 4", or until a predetermined pressure limit is exceeded. If the travel limit has occurred before the pressure limit is met, loading vehicle processor means will deactivate the operational movements of loading vehicle 10. If the pressure limit is met, y-axis movement stops and loading vehicle processor means prepares for unit load deposition. The unit load deposition process comprises a sequence of events that moves plate means 24 and plate handling means 20 away from the pallet stack in the y-axis. Unit load removal means 26 exerts a constant predetermined force on the unit load, as measured by pressure sensor means 60 to maintain the unit load in a stationary position and push plate means 24 and plate handling means 20 away from the unit load. Once the unit load removal means 26 is in the fully extended position, unit load removal sensor means 64 produces a removal sensor signal indicating that the unit load has been removed from plate means 24, in the same manner as described above used in depositing unit loads in the transport vehicle 112. After the unit load has been removed from the plate means, the unit load removal means 26 is fully retracted and plate means 24 is placed in the carrying position as loading vehicle 10 exits transport vehicle 112.

FIG. 10 also illustrates deposition of unit loads in the doorway #1 upper position. Loading vehicle 10 receives a unit load from staging means 78, proceeds with the pallet towards transport vehicle opening 110 maintaining a fixed distance from side reference plate means 102 by using left side sensors 48, 52. Loading vehicle 10 travels a fixed distance forward based upon placement information provided by staging processor means 100. After the loading vehicle 10 is positioned just outside the railcar doorway, vertical movement is initiated in response to operational control signals produced by the loading vehicle processor means 76 to place the unit load at the correct height for loading. This position is verified by a vertical absolute position sensor signal produced by vertical absolute position sensor means 40. Subsequently, the loading vehicle travels a fixed distance into transport vehicle 112 based upon placement information provided by staging processor means 100. Front vehicle sensor means produces loading vehicle longitudinal position signals to verify the longitudinal displacement of loading vehicle 10 from transport vehicle wall 114. From this information, loading vehicle 10 is placed in an approximate position to begin pallet deposition in the doorway #1 upper position.

Front vehicle sensor means 56 provides the loading vehicle longitudinal position signal which is used by loading vehicle processor means to position plate means 24 and the unit load in the x-direction. The unit load is positioned a fixed distance from transport vehicle wall 114. Longitudinal absolute position sensor means produces operational sensor signals or unit load carrying device position signals which are combined with the loading vehicle longitudinal position signals produced by rear vehicle sensor means 56 to yield the unit load location information for proper placement in the x-axis. Plate handling means 20 then moves the unit load in the y-axis until plate sensor means produces a plate sensor signal indicating that the unit load is within a predetermined distance of the pallet wall, i.e., 4" of the pallet wall. The unit load is consequently fully positioned in the x-axis and vertical axis and only needs final positioning in the y-axis.

Final y-axis pallet placement is achieved by moving plate handling means 20 in the y-axis direction while monitoring pressure sensor signals produced by pressure sensor means 60. Movement in the y-direction is programmed to continue for a predetermined distance, e.g., 4", or until a predetermined pressure limit is exceeded. If the travel limit has occurred before the pressure limit is met, loading vehicle processor means will deactivate the operational movements of loading vehicle 10. If the pressure limit is met, y-axis movement stops and loading vehicle processor means prepares for unit load deposition. The unit load deposition process comprises a sequence of events that moves plate means 24 and plate handling means 20 away from the pallet stack in the y-axis. Unit load removal means 26 exerts a constant predetermined force on the unit load, as measured by pressure sensor means 60 to maintain the unit load in a stationary position and push plate means 24 and plate handling means 20 away from the unit load. Once the unit load removal means 26 is in the fully extended position, unit load removal sensor means 64 produces a removal sensor signal indicating that the unit load has been removed from plate means 24, in the same manner as described above used in depositing unit loads in the transport vehicle 112. After the unit load has been removed from the plate means, the unit load removal means 26 is fully retracted and plate means 24 is placed in the carrying position as loading vehicle 10 exits transport vehicle 112.

Figure 11:
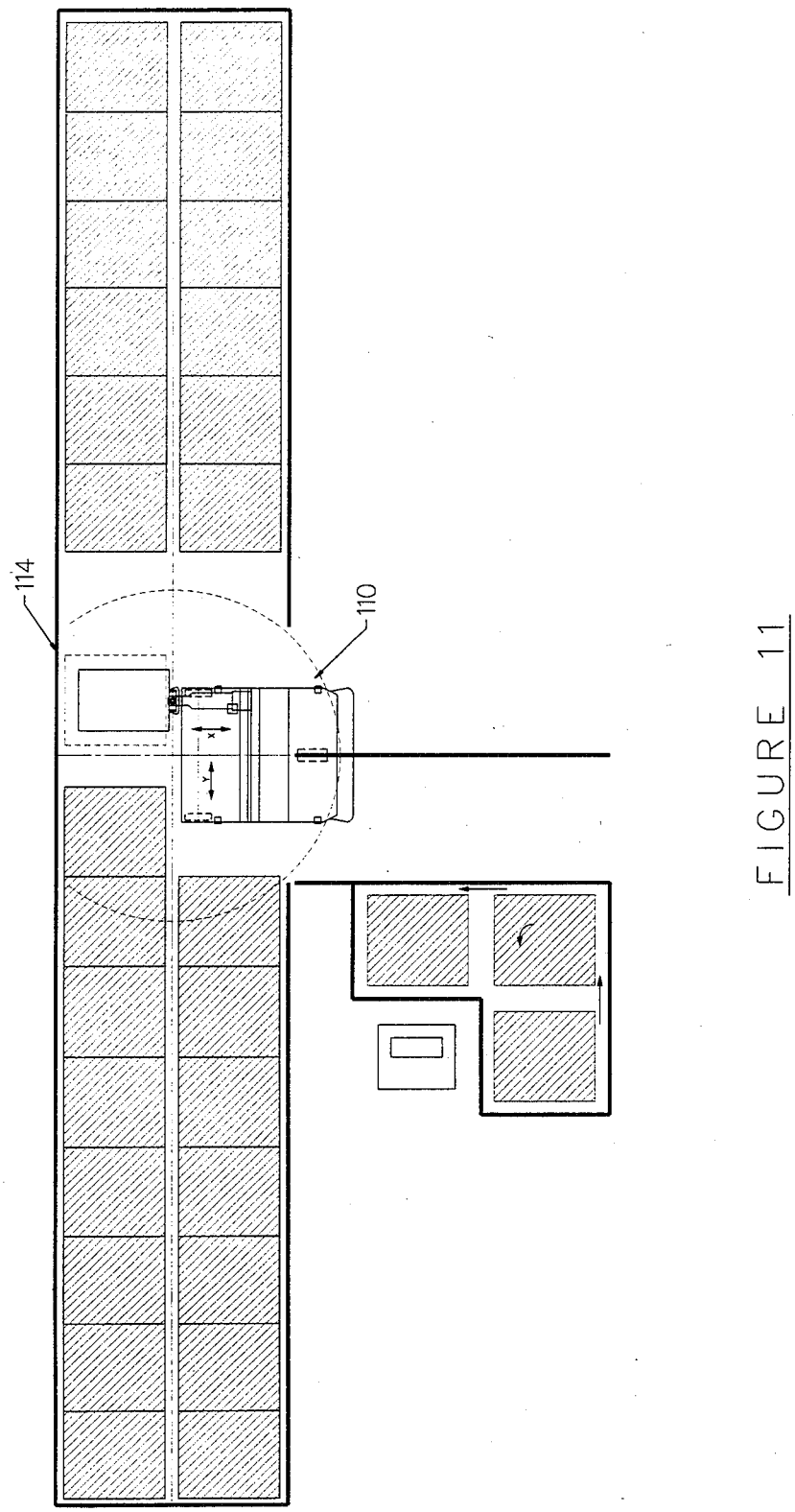
FIG. 11 illustrates the loading vehicle depositing a unit load in the #2 doorway position.
Figure 12:
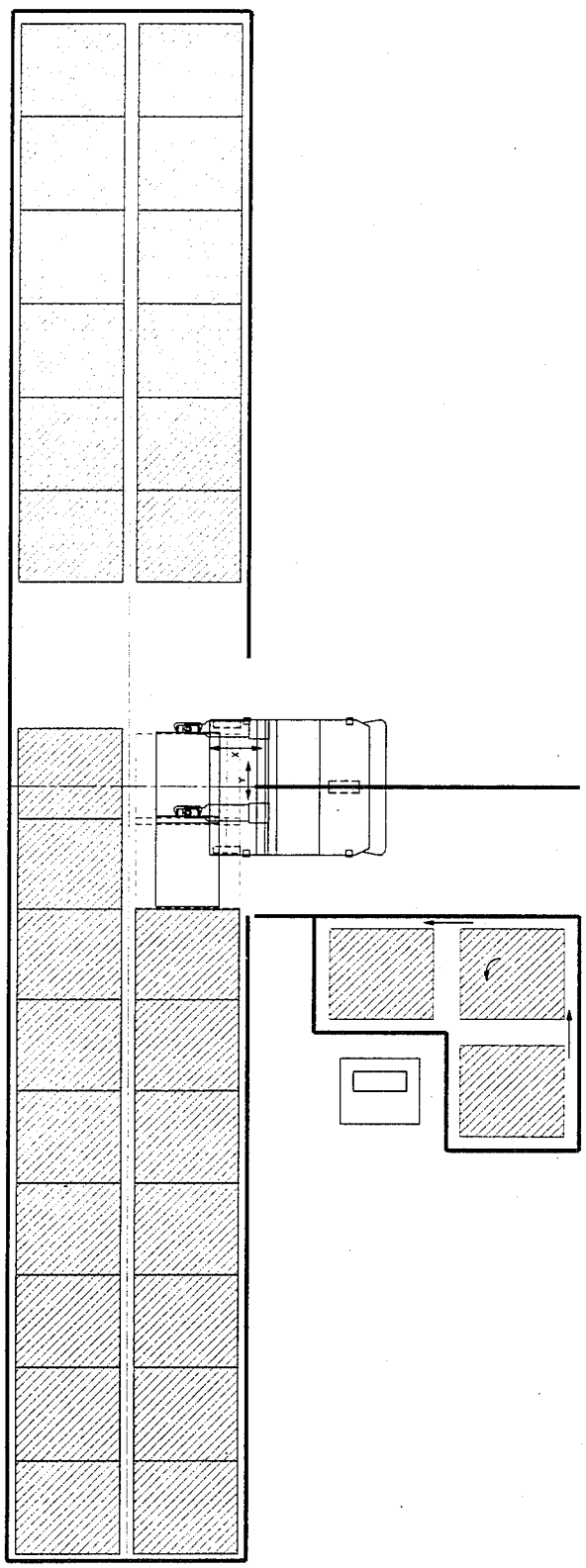
FIG. 12 schematically illustrates the loading vehicle depositing a unit load in the #3 doorway position.
Figure 13:
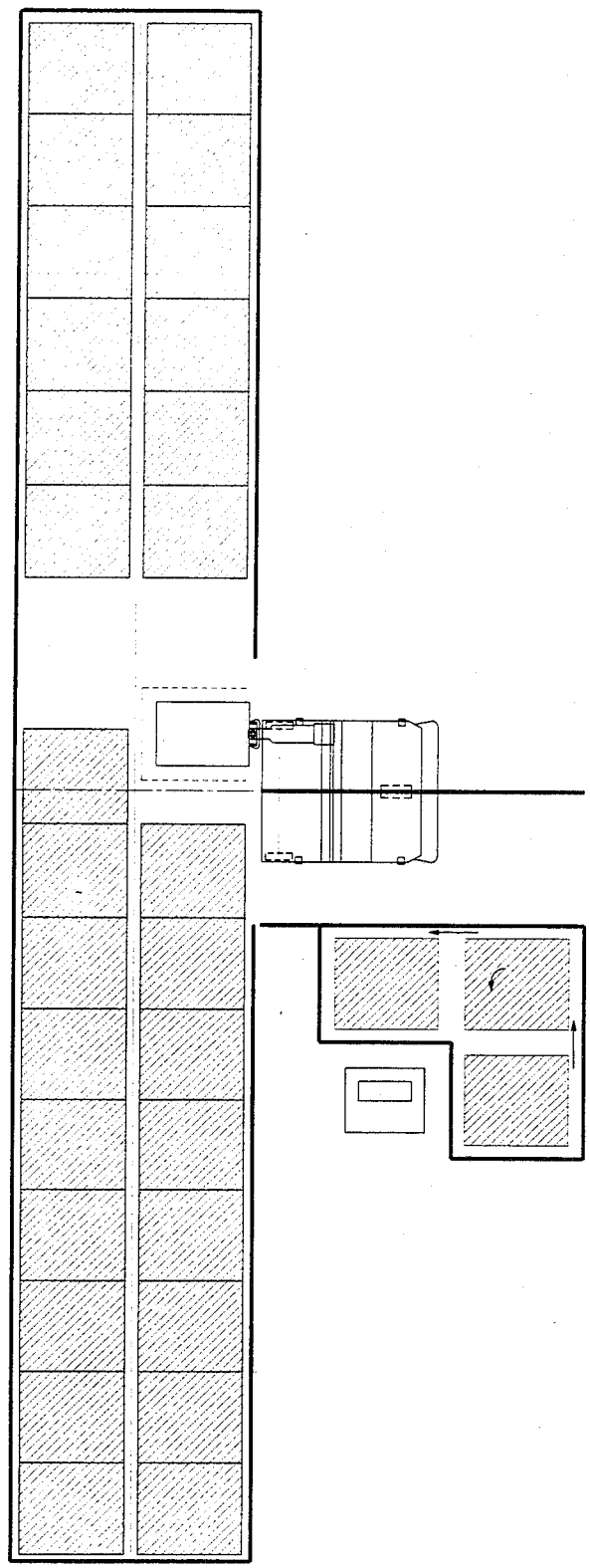
FIG. 13 comprises a top schematic view of the loading vehicle depositing a unit load in the #4 doorway position.
Figure 14:
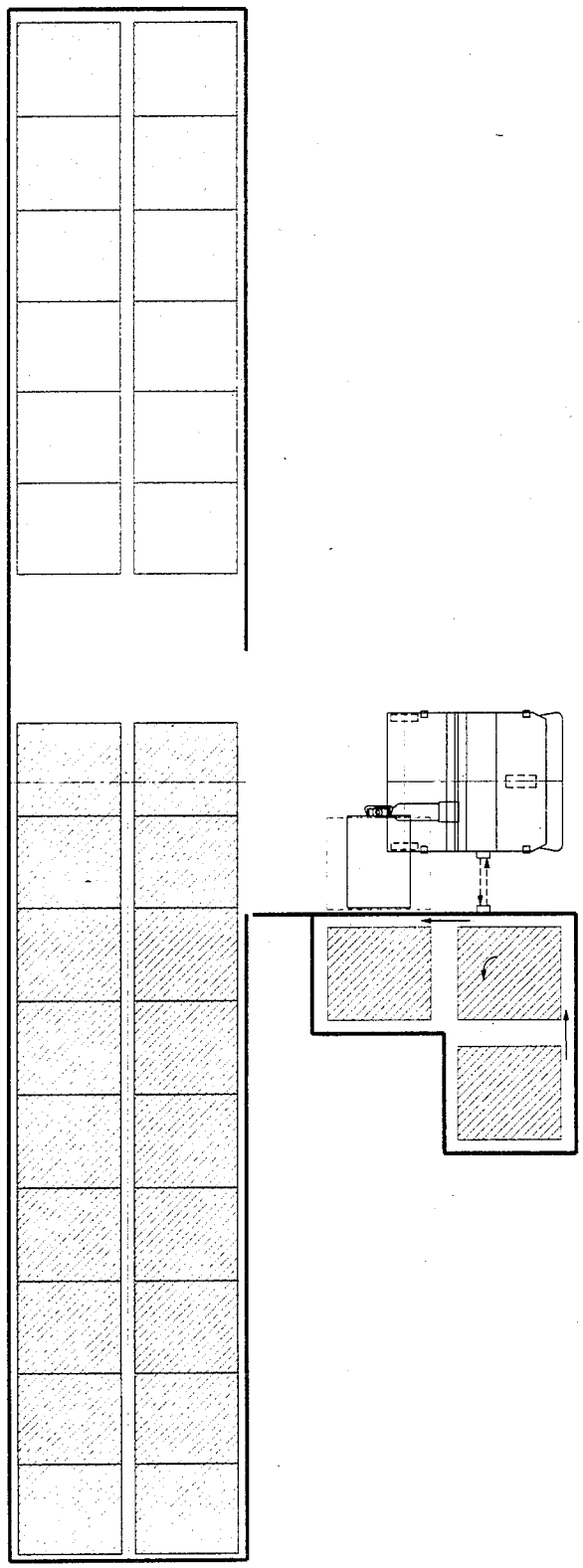
FIG. 14 illustrates the railcar in a fully loaded condition.

FIG. 12 illustrates deposition of unit loads in the doorway #3 position, which is accomplished in the same manner as the doorway #1 position. FIGS. 11 and 13 illustrated deposition of pallets in the doorway #2 and doorway #4 positions.

As illustrated in FIG. 11, loading vehicle 10 rotates plate means 24 to the 90° position so that it is facing transport vehicle wall 114. In this manner, plate sensor means detects the final x-axis movement required to place the unit load in the appropriate x-axis position. Loading vehicle 10 proceeds with the unit load and placement information provided by staging processor means 100 towards opening 110 while maintaining a fixed distance from side reference plate means 102 in response to loading vehicle transverse position signals produced by side sensors 48, 52. After loading vehicle 10 has moved a fixed distance, placing the loading vehicle 10 just outside the railcar doorway, vertical movement will be initiated in response to operational control signals produced by the loading vehicle processor means 76 to place the unit load in the correct height for loading, i.e., either the lower or upper position. This position is verified by a vertical absolute position sensor signal produced by vertical absolute position sensor means 40. Subsequently, the loading vehicle will travel a fixed distance into transport vehicle 112 based upon placement information provided by staging processor means 100. This places the unit load in the approximate position to begin the unit load deposition process. Plate sensor means 46 produces a plate sensor signal indicating the distance of the unit load from outside wall 114, or from an adjacent pallet displaced in the x-direction. Final forward movement of loading vehicle 10 into the railcar is based upon the plate sensor signal produced by plate sensor means 46.

Unit load placement is achieved by moving plate means 24 within a predetermined distance, i.e., 4", of transport vehicle wall 114. This distance is determined by plate sensor means 46, as disclosed above. Plate handling means 20 performs the final adjustments in the x-axis to correctly position the unit load with respect to transport vehicle sidewall 114. In a similar manner, plate handling means 20 moves the unit load in the y-axis to shift the unit load towards the unit load wall. The force required to move plate handling means 20 in the y-axis is used to determine proper placement of the unit load in the y-axis against the existing pallet wall. The pallet deposition process is the same as that performed in unloading unit loads in the sides of transport vehicle 112. Unit load removal means 26 removes the unit loads from the plate means 24 while pressure sensor means 60 detects the uniform pressure generated between the unit load removal means 26 and the unit load. In response to the pressure generated by the unit load removal means 26, loading vehicle 10 is pushed in a rearward direction away from the unit load.

After the unit load has been deposited in the doorway positions, loading vehicle 10 exits the transport vehicle 112 and performs a docking maneuver adjacent staging means 78. Transport vehicle 112 is then secured for transportation.

FIGS. 15, 16, 17 comprise a flow diagram of the functions performed in accordance with the present invention. The flow diagram is broken down into three sections, i.e., preparation, side loading and doorway loading. Each of the functions set forth in the flow diagram of FIGS. 15, 16, and 17 is described in detail infra.

Consequently, the present invention provides a system for automatically loading a transport vehicle with unit loads by automatically moving the unit loads from a predetermined loading position to described positions in the transport vehicle. The present invention is capable of using an internally generated guide path or an internally generated guide path in combination with an external guide path. Accuracy of placement of unit loads in prescribed positions is achieved through various sensors which provide both translational sensor signals and operational sensor signals to place the unit loads in the prescribed positions with a high degree of accuracy.

The foregoing description of the invention has been presented for purposes of illustration and description. It is not intended to be exhaustive or to limit the invention to the precise form disclosed and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A system for automatically loading a transport vehicle with unit loads by automatically moving said unit loads from a predetermined loading position to prescribed positions in said transport vehicle comprising:

staging means for precisely positioning said unit loads in said predetermined loading position;

loading vehicle means for receiving said unit loads from said predetermined loading position and placing said unit loads in said prescribed positions in said transport vehicle;

stage processor means for producing placement signals indicative of placement of said unit loads in said prescribed positions in said transport vehicle;

communication means for transmitting said placement signals from said stage processor means to said loading vehicle means;

sensor means for producing translational and operational sensor signals to indicate translational and operational movements of said loading vehicle;

loading vehicle processor means for producing steering control signals to guide said loading vehicle means along a predetermined path internally generated by said loading vehicle processor means in response to said translational sensor signals and said placement signals, and for producing operational movement signals in response to said operational sensor signals and said placement signals to receive said unit loads from said staging means and placing said unit loads in said prescribed positions;

wherein said loading vehicle means comprises:
plate means for carrying said unit loads;
plate handling means for moving said plate means in response to said operational movement signals;

wherein said sensor means comprises:
loading vehicle sensor means disposed on said loading vehicle means for detecting said translational movements of said loading vehicle means and said operational movements of said plate means;

wherein said loading vehicle sensor means comprises:
absolute position sensor means coupled to said plate handling means for producing plate position signals indicative of said operational movements of said plate means in longitudinal, transverse, rotational and vertical directions;

unit load removal means for responding to a unit load removal signal to remove said unit loads from said plate means and place said unit loads in said prescribed positions by pushing said unit loads from said plate means with a substantially uniform pressure sufficient to move said loading vehicle means away from said unit loads and place said unit loads in said prescribed positions in said transport vehicle;

pressure sensor means for producing pressure signals indicative of pressure generated between said unit load removal means and said unit loads during removal of said unit loads from said plate means by said unit load removal means to maintain said substantially uniform pressure.

2. The system of claim 1 further comprising:
unit load removal sensor means for producing a removal sensor signal indicating removal of said unit loads from said plate means.

3. The system of claim 2 wherein said transport vehicle comprises a railcar.

4. The system of claim 3 wherein said plate handling means is capable of placing said unit loads in said prescribed positions from said predetermined path which is substantially centered in said transport vehicle.

5. The system of claim 2 further comprising:
unit load transfer means for transferring said unit loads from said staging means to said plate means such that said unit loads are precisely positioned on said plate means.

6. The system of claim 5 wherein said staging sensor means further comprises:
unit load clear sensor means for sensing completion of transfer of said unit loads from said staging means to said plate means.

7. A system for automatically loading a transport vehicle with unit loads by automatically moving said unit loads from a predetermined loading position to prescribed positions in said transport vehicle comprising:
loading vehicle means for receiving said unit loads from said predetermined loading position and placing said unit loads in said prescribed positions in said transport vehicle, said loading vehicle means comprising:
plate means for carrying said unit loads;
plate handling means for producing plate control signals to move said plate means in longitudinal, transverse, rotational and vertical directions with respect to said loading vehicle means;
side sensor means for producing loading vehicle transverse position signals indicative of transverse displacement of said loading vehicle means from side objects;
front vehicle sensor means for producing loading vehicle longitudinal position signals indicative of longitudinal displacement of said loading vehicle from front and back objects;
absolute position sensor means coupled to said plate handling means for producing plate position signals indicative of the position of said plate handling means;
unit load removal means for producing a unit load removal signal for removing said unit loads from said plate means for placement in said prescribed positions;
steering means for guiding said loading vehicle means in response to steering control signals;
pressure sensor means for producing pressure signals indicative of pressure generated between said unit load removal means and said unit loads;
staging means for precisely positioning said unit loads in said predetermined loading position comprising:
positioning means for receiving said unit loads from a unit load source and positioning said unit loads in said predetermined loading position;
staging sensor means for producing plate location signals indicative of the position of said plate means relative to said staging means;
unit load transfer means for transferring said unit loads from said staging means to said plate means such that said unit loads are precisely positioned on said plate means;
stage processor means for producing placement signals indicative of placement of said unit loads in said prescribed positions in said transport vehicle;
communication means for transmitting said placement signals from said stage processor means to said loading vehicle;
loading vehicle processor means for producing said steering control signals in response to said loading vehicle transverse position signals to position said loading vehicle adjacent said staging means and to guide said loading vehicle means along a path substantially centered in said transport vehicle, and for producing said steering control signals in response to said loading vehicle longitudinal position signals to guide said loading vehicle through a side opening in said transport vehicle and turn said loading vehicle in said transport vehicle, and for producing said plate control signals in response to said plate position signals to position said plate means for transferring said unit loads from said staging means to said plate means and for placing said unit loads in said prescribed positions.

8. The system of claim 7 comprising:
unit load removal means for producing a unit load removal signal to remove said unit loads from said plate means and place said unit loads in said prescribed positions by pushing said unit loads from said plate means with a substantially uniform pressure sufficient to move said loading vehicle means away from said unit loads and place said unit loads in said prescribed positions in said transport vehicle;
pressure sensor means for producing pressure signals indicative of pressure generated between said unit load removal means and said unit loads during removal of said unit loads from said plate means by said unit load removal means to maintain said substantially uniform pressure.

9. The system of claim 8 further comprising: unit load removal means for producing a removal sensor signal indicating removal of said unit loads from said plate means.

10. The system of claim 9 further comprising: measurement encoder means for producing a distance measurement signal indicative of the distance traveled by said loading vehicle means.

11. The system of claim 10 wherein said transport vehicle comprises a railcar.

12. The system of claim 9 wherein said plate handling means is capable of placing said unit loads in said prescribed positions from said path substantially centered in said transport vehicle.

13. A system for automatically loading a transport vehicle with unit loads by automatically moving said unit loads along an externally defined course in combination with an internally generated course from a predetermined loading position to prescribed positions in said transport vehicle comprising:
loading vehicle means for receiving said unit loads from said predetermined loading position and placing said unit loads in said prescribed positions in said transport vehicle, said loading vehicle means comprising:
plate means for carrying said unit loads;
plate handling means for producing operational movement signals to move said plate means in lateral, transverse and rotational directions with respect to said loading vehicle means;
side sensor means for producing loading vehicle transverse position signals indicative of transverse displacement of said loading vehicle from side objects;
front vehicle sensor means for producing loading vehicle longitudinal position signals indicative of longitudinal displacement of said loading vehicle from longitudinally displaced objects;
absolute position sensor means coupled to said plate handling means for producing plate position signals indicative of the longitudinal, transverse, rotational and vertical position of said plate means;
steering means for guiding said loading vehicle means in response to steering control signals;
external course sensor means for producing an external course sensor signal indicative of the position of said loading vehicle means relative to said externally defined course;
staging means for precisely positioning said unit loads in said predetermined loading position comprising:
positioning means for receiving said unit loads from a unit load source and positioning said unit loads in said predetermined loading position;
staging sensor means for producing plate location signals indicative of the position of said plate means relative to said staging means;
unit load transfer means for transferring said unit loads from said staging means to said plate means such that said unit loads are precisely positioned on said plate means;
stage processor means for producing placement signals indicative of placement of said unit loads in said prescribed positions in said transport vehicle;
communication means for transmitting said placement signals from said stage processor means to said loading vehicle;
loading vehicle processor means for producing said steering control signals in response to said external course sensor signal to guide said loading vehicle on said externally defined course, and in response to said loading vehicle transverse position signals to guide said loading vehicle means along a path substantially centered in said transport vehicle, and in response to said loading vehicle longitudinal position signals to guide said loading vehicle means through a side opening in said transport vehicle and turn said loading vehicle in said transport vehicle, and for producing said operational movement signals in response to said plate position signals to position said plate means for transferring said unit loads from said staging means to said plate means and for placing said unit loads in said prescribed positions.

14. The system of claim 13 further comprising:
unit load removal means for producing a unit load removal signal to remove said unit loads from said plate means and place said unit loads in said prescribed positions by pushing said unit load from said plate means with a substantially uniform pressure sufficient to move said loading vehicle means away from said unit loads and place said unit loads in said prescribed positions in said transport vehicle;
pressure sensor means for producing pressure signals indicative of pressure generated between said unit load removal means and said unit loads during removal of said unit loads from said plate means by said unit load removal means to maintain said substantially uniform pressure.

15. The system of claim 14 further comprising:
unit load removal sensor means for producing a removal sensor signal indicating removal of said unit loads from said plate means.

16. The system of claim 15 further comprising:
measurement encoder means for producing a distance measurement signal indicative of the distance traveled by said loading vehicle means.

17. The system of claim 16 wherein said transport vehicle comprises a railcar.

18. The system of claim 17 wherein said externally defined course comprises a wire guided course.

19. The system of claim 15 wherein said plate handling means is capable of placing said unit loads in said prescribed positions from said path substantially centered in said transport vehicle.

20. A method of automatically loading a transport vehicle with unit loads by automatically moving said unit with a loading vehicle from a predetermined loading position on a staging device to prescribed positions in said transport vehicle comprising the steps of:
  positioning said unit loads in said predetermined loading position on said staging device;
  transferring said unit loads from said staging device to said loading vehicle;
  generating placement signals from a staging processor indicative of placement of said unit loads in said prescribed positions;
  communicating said placement signals from said staging processor to a loading vehicle processor disposed on said loading vehicle;
  generating translational sensor signals indicative of translational movements of said loading vehicle means;
  generating operational sensor signals indicative of operational movements of a unit load carrying device;
  generating translational control signals in said loading vehicle processor in response to said placement signals and said translational sensor signals to guide said loading vehicle along a predetermined internally defined path in said transport vehicle and between said staging means and said transport vehicle;
  generating operational control signals in said loading vehicle processor in response to said placement signals and said operational sensor signals to control operational movements of said unit load carrying device to receive said unit loads from said predetermined loading position and place said unit loads in said prescribed positions;
  wherein said step of generating translational sensor signals comprises:
    producing a distance measurement signal indicative of the translational distance traveled by said loading vehicle means;
    producing loading vehicle transverse position signals indicative of transverse displacement of said loading vehicle from side objects;
    producing loading vehicle longitudinal position signals indicative of longitudinal displacement of said loading vehicle from longitudinally displaced objects;
  wherein said step of generating operational control signals comprises:
    producing unit load carrying device control signals to move said unit load carrying device in longitudinal, transverse, rotational and vertical directions;
    producing a unit load removal signal to remove said unit loads from said unit load carrying device and place said unit loads in said prescribed positions by pushing said unit loads from said plate means with a substantially uniform pressure sufficient to move said loading vehicle away from said unit loads and place said unit loads in said prescribed positions in said transport vehicle; wherein said step of generating operational sensor signals comprises:
    producing unit load carrying device position signals indicative of the absolute position of said unit load carrying device relative to said loading vehicle;
    producing pressure signals indicative of pressure generated between a unit load removal device and said unit loads during removal of said unit loads from said unit load carrying device by said unit load removal device to maintain said substantially uniform pressure.

21. A method of automatically loading a transport vehicle with unit loads by automatically moving said unit loads with a loading vehicle from a predetermined loading position on a staging device to prescribed positions in said transport vehicle comprising the steps of:
  positioning said unit loads in said predetermined loading position on said staging device;
  transferring said unit loads from said staging device to said loading vehicle;
  generating placement signals from a staging processor indicative of placement of said unit loads in said prescribed positions;
  communicating said placement signals from said staging processor to a loading vehicle processor disposed on said loading vehicle;
  generating translational sensor signals indicative of translational movements of said loading vehicle means;
  generating operational sensor signals indicative of operational movements of a unit load carrying device;
  generating translational control signals in said loading vehicle processor in response to said placement signals and said translational sensor signals to guide said loading vehicle along an externally defined course between said staging means and said transport vehicle and along an internally defined course through a side opening in said transport vehicle and in said transport vehicle;
  generating operational control signals in said loading vehicle processor in response to said placement signals and said operational sensor signals to control operational movements of said unit load carrying device to receive said unit loads from said predetermined loading position and place said unit loads in said prescribed positions;
  wherein said step of generating translational sensor signals comprises:
    producing a distance measurement signal indicative of the translational distance traveled by said loading vehicle means;
    producing loading vehicle transverse position signals indicative of transverse displacement of said loading vehicle from side objects;
    producing loading vehicle longitudinal position signals indicative of longitudinal displacement of said loading vehicle from longitudinally displace objects;
    producing an external course sensor signal indicative of the position of said loading vehicle means relative to said externally defined course;
  wherein said step of generating operational sensor signals comprises:
    producing unit load carrying device position signals indicative of the absolute position of said unit load carrying device relative to said loading vehicle;
    producing pressure signals indicative of pressure generated between a unit load removal device and said unit loads during removal of said unit loads from said unit load carrying device by said unit load removal device to maintain a substantially uniform pressure.

22. The method of claim 21 wherein said step of generating operational control signals comprises:
producing unit load carrying device control signals to move said unit load carrying device in longitudinal, transverse, rotational and vertical directions;
producing a unit load removal signal to remove said unit loads from said unit load carrying device and place said unit loads in said prescribed positions by pushing said unit loads from said plate means with a substantially uniform pressure sufficient to move said loading vehicle away from said unit loads and place said unit loads in said prescribed positions in said transport vehicle.

23. A system for automatically loading a plurality of transport vehicles having various sizes and shapes and positionable for loading in variable relationship with a loading dock with unit loads by automatically moving said unit loads from a predetermined loading position on the loading dock to prescribed positions in the transport vehicle to be loaded comprising:
staging means on the loading dock for precisely positioning said unit loads in said predetermined loading position;
loading vehicle means for receiving said unit loads from said predetermined loading position and placing said unit loads in said prescribed positions in said transport vehicle;
stage processor means for receiving data indicative of the dimensions and loading space available in a transport vehicle to be loaded and for producing placement signals indicative of said prescribed positions in said transport vehicle for placement of said unit loads;
communication means for transmitting said placement signals from said stage processor means to said loading vehicle means;
sensor means for sensing the distance of said loading vehicle from various objects including the door opening periphery of said transport vehicle to be loaded, and for producing translational and operational sensor signals to indicate translational and operational movements of said loading vehicle necessary to avoid said various objects and to properly orient said loading vehicle relative said transport vehicle to be loaded;
loading vehicle processor means for producing steering control signals to guide said loading vehicle means into and out of said transport vehicle along a predetermined path internally generated by said loading vehicle processor means in response to said translational sensor signals and said placement signals, and for producing operational movement signals in response to said operational sensor signals and said placement siganls to receive said unit loads from said staging means and to place said unit loads in said prescribed positions.

24. The system of claim 23 wherein said loading vehicle means comprises:
plate means for carrying said unit loads;
plate handling means for moving said plate means in response to said operational movement signals.

25. The system of claim 24 wherein said sensor means comprises:
loading vehicle sensor means disposed on said loading vehicle means for detecting said translational movements of said loading vehicle means and said operational movements of said plate means.

26. The system of claim 25 wherein said sensor means comprises:
staging sensor means disposed in a stationary position proximate to said staging means for detecting operational movements of said plate means.

27. The system of claim 25 wherein said loading vehcile sensor means comprises:
measurements encoder means for producing a distance measurement signal indicative of the translational distance traveled by said loading vehicle means.

28. The system of claim 25 wherein said loading vehicle sensor means comprises:
absolute position sensor means coupled to said plate handling means for producing plate position signals indicative of said operational movements of said plate means in longitudinal, transverse, rotational and vertical directions.

29. A system for automatically loading a plurality of transport vehicles having various sizes and shapes and positionable for loading in variable relationship with a loading dock with unit loads by automatically moving said unit loads from a predetermined loading position on the loading dock to prescribed positions in the transport vehicle to be loaded comprising:
staging means on the loading dock for precisely positioning said unit loads in said predetermined loading position;
loading vehicle means for receiving said unit loads from said predetermined loading position and placing said unit loads in said prescribed positions in said transport vehicle;
stage processor means for receiving data indicative of the dimensions and loading space available in a tansport vehicle to be loaded and for producing placement signals indicative of said prescribed positions in said transport vehicle for placement of said unit loads;
communication means for transmitting said placement signals from said stage processor means to said loading vehicle means;
sensor means for sensing the distance of said loading vehicle from various objects loaded, and for producing translational and operational sensor signals to indicate translational and operational movements of said loading vehicle necessary to avoid said various objects and to properly orient said loading vehicle relative said transport vehicle to be loaded;
loading vehicle processor means for producing steering control signals to guide said loading vehicle means into and out of said transport vehicle along a predetermined path internally generated by said loading vehicle processor means and an internally defined course between said staging means and said transport vehicle in response to said translational sensor signals and said placement signals, and for producing operational movement signals in response to said operational sensor signals and said placement signals to receive said unit loads from said staging means and to place said unit loads in said prescribed positions.

30. The system of claim 29 wherein said loading vehicle means comprises:

plate means for carrying said unit loads; plate handling means for moving said plate means in response to said operational movement signals.

31. The system of claim 30 wherein said sensor means comprises:
loading vehicle sensor means disposed on said loading vehicle means for detecting said translational movements of said loading vehicle means and said operational movements of said plate means.

32. The system of claim 31 wherein said sensor means comprises:
staging sensor means disposed in a stationary position proximate to said staging means for detecting operational movements of said plate means.

33. The system of claim 32 wherein said loading vehicle sensor means comprises:
measurement encoder means for producing a distance measurement signal indicative of the translational distance traveled by said loading vehicle means.

34. The system of claim 30 further comprising:
externally defined couse means for providing said external defined course between said staging means and said transport vehicle;
external couse sensor means for producing an external course signal indicative of the position of said loading vehicle means relative to said externally defined course.

35. The system of claim 31 wherein said loading vehicle sensor means comprises:
absolute position sensor means coupled to said plate handling means for producing plate position signals indicative of said operational movements of said plate means in longitudinal, transverse, rotational and vertical directions.

36. The system of claim 35 further comprising:
unit load removal means for responding to a unit load removal signal to remove said unit loads from said plate means and place said unit loads in said prescribed positions by pushing said unit load from said plate means with a substantially uniform pressure sufficient to move said loading vehicle means away from said unit loads and place said unit loads in said prescribed positions in said transport vehicle;
pressure sensor means for producing pressure signals indicative of pressure generated between said unit load removal means and said unit loads during removal of said unit loads from said plate means by said unit load removal means to maintain said substantially uniform pressure.

37. The system of claim 36 further comprising:
unit load removal sensor means for producing a removal sensor signal indicating removal of said unit loads from said plate means.

38. The system of claim 37 further comprising:
measurement encoder means for producing a distance measurement signal indicative of the distance traveled by said loading vehicle means.

39. The system of claim 38 wherein said transport vehicle comprises a railcar.

40. The system of claim 39 wherein said externally defined course comprises a wire guided course.

41. The system of claim 37 wherein said plate handling means is capable of placing said unit loads in said prescribed positions from said path substantially centered in said transport vehicle.

42. The system of claim 63 further comprising:
unit load transfer means for transferring said unit load from said staging means to said plate means such that said unit loads are precisely positioned on said plate means.

43. The system of claim 42 wherein said staging sensor means further comprises:
unit load clear sensor means for senisng completion of transfer of said unit loads from said staging means to said plate means.

44. A method of automatically loading a transport vehicle with unit loads by automatically moving said unit loads with a loading vehicle from a predetermined loading position on a staging device to prescribed positions in said transport vehicle comprising the steps of:
positioning said unit loads in said predetermined loading position on said staging device;
transferring said unit loads from said staging device to said loading vehicle;
generating placement signals from a staging processor indicative of placement of said unit loads in said prescribed positions;
communicating said placement signals from said staging processor to a loading vehicle processor disposed on said loading vehicle;
sensing the position of various objects including the position of the door opening of the transport vehicle and generating object sensing signals indicative of the position of said various objects;
generating translational sensor signals indicative of translational movements of said loading vehicle means;
generating operational sensor signals indicative of operational movements of a unit load carrying device;
generating translational control signals to said loading vehicle processor in response to said object sensing signals said placement signals and said translational sensor signals to guide said loading vehicle along predetermined internally defined path in said transport vehicle and between staging means and said transport vehicle;
generating operational control signals in said loading vehicle processor in response to said placement signals and said operational sensor signals to control operational movements of said unit load carrying device to receive said unit loads from said predetermined loading position and place said unit loads in said prescribed positions.

45. The method of claim 44 wherein said step of generating translational sensor signals comprises:
producing a distance measurement signal indicative of the translational distance traveled by said loading vehicle means; and
wherein said step of generating object sensing signals comprises:
producing loading vehicle transverse position signals indicative of transverse displacement of said loading vehicle from said objects;
producing loading vehicle longitudinal position signals indicative of longitudinal displacement of said loading vehicle from longitudinal displaced objects.

46. The method of claim 45 wherein said step of generating operational control signals comprises:
producing unit load carrying device control signals to move said unit load carrying device in longitudinal, transverse, rotational and vertical directions;

producing a unit load removal signal to remove said unit loads from said unit load carrying device and place said unit loads in said prescribed positions by pushing said unit loads from said plate means with a substantially uniform pressure sufficient to move said loading vehicle away from said unit loads and place said unit loads in said prescribed positions in said transport vehicle.

47. The method of claim 46 wherein said step of generating operational sensor signals comprises:
producing unit load carrying device position signals indicative of the absolute position of said unit load carrying device relative to said loading vehicle;
producing pressure signals indicative of pressure generated between a unit load removal device and said unit loads during removal of said unit loads from said unit laod carrying device by said unit load removal device to maintain said substantially uniform pressure.

48. A method of automatically loading a transport vehicle with unit loads by automatically moving said unit loads with a loading vehicle from a predetermined loading position on a staging device to prescribed positions in said transport vehicle comprising the steps of:
positioning said unit loads in said predetermined loading position on said staging device;
transferring said unit loads from said staging device to said loading vehicle;
generating placement signals from a staging processor indicative of placement of said unit loads in said prescribed positions;
commumciating said placement signals from said staging processor to a loading vehicle processor disposed on said loading vehicle;
sensing the position of various objects and generating object snesing signals indicative of the position of said various objects;
generating translational sensor signals indicative of translational movements of said loading vehicle means;
generating operational sensor signals indicative of operational movements of a unit load carrying device;
generating translational control signals in said loading vehicle processor in response to said placement siganls and said translational sensor signals to guide said loading vehicle along an externally defined course between said staging means and said transport vehicle and along an internally defined course through a side opening in said transport vehicle and in said transport vehicle;
generating operational control signals in said loading vehicle processor in response to said placement siganls and said operational sensor signals to control operational movements of said unit load carrying device to receive said unit loads from said predetermined loading position and place said unit loads in said prescribed positions.

49. The method of claim 48 wherein said step of generating translational sensor signals comprises:
producing a distance measurement signal indicative of the translational distance traveled by said loading vehicle means;
producing loading vehicle transverse position siganls indicative of transverse displacement of said loading vehicle from side objects;
producing loading vehicle longitudinal position signals indicative of longitudinal displacement of said loading vehicle from longitudinally displace objects;
producing an external course sensor signal indicative of the position of said loading vehicle means relative to said externally defined course.

* * * * *